US00RE46462E

(19) United States
(12) Reissued Patent
Huber et al.

(10) Patent Number: US RE46,462 E
(45) Date of Reissued Patent: Jul. 4, 2017

(54) APPARATUS, SYSTEMS AND METHODS FOR CONDITIONING MOLTEN GLASS

(71) Applicant: Johns Manville, Denver, CO (US)

(72) Inventors: Aaron Morgan Huber, Castle Rock, CO (US); Marlon Keith Martin, Etowah, TN (US); John Euford Mobley, Vonore, TN (US)

(73) Assignee: Johns Manville, Denver, CO (US)

(21) Appl. No.: 14/807,494

(22) Filed: Jul. 23, 2015

Related U.S. Patent Documents

Reissue of:

(64) Patent No.: 8,707,739
Issued: Apr. 29, 2014
Appl. No.: 13/493,170
Filed: Jun. 11, 2012

(51) Int. Cl.

| | |
|---|---|
| ***C03B 5/20*** | (2006.01) |
| ***C03B 5/16*** | (2006.01) |
| ***C03B 5/235*** | (2006.01) |
| ***C03B 7/02*** | (2006.01) |
| ***C03B 7/06*** | (2006.01) |

(52) U.S. Cl.

CPC ..... *C03B 5/202* (2013.01); *C03B 5/205* (2013.01); *C03B 5/2356* (2013.01); *C03B 7/02* (2013.01); *C03B 7/06* (2013.01)

(58) Field of Classification Search
CPC ..... C03B 5/202; C03B 5/205; C03B 5/20
See application file for complete search history.

(56) References Cited

U.S. PATENT DOCUMENTS

| | | | |
|---|---|---|---|
| 1,716,433 | A | 6/1929 | Ellis |
| 2,174,533 | A | 10/1939 | See et al. |
| 2,118,479 | A | 1/1940 | McCaskey |
| 2,269,459 | A | 1/1942 | Kleist |

(Continued)

FOREIGN PATENT DOCUMENTS

| | | | |
|---|---|---|---|
| DE | 3217414 | C1 | 7/1983 |
| DE | 3716687 | C1 | 11/1988 |

(Continued)

OTHER PUBLICATIONS

"Glass Industry of the Future", United States Department of Energy, report 02-GA50113-03, pp. 1-17, Sep. 30, 2008.

(Continued)

*Primary Examiner* — Carlos Lopez

(57) ABSTRACT

Channel apparatus for use with submerged combustion systems and methods of use to produce glass. One channel apparatus includes a flow channel defined by a floor, a roof, and a wall structure connecting the floor and roof, the flow channel divided into sections by a series of skimmers. Channel apparatus include both high and low momentum combustion burners, with one or more high momentum combustion burners positioned immediately upstream of each skimmer in either the roof or sidewall structure, or both, and one or more low momentum combustion burners positioned immediately downstream of each skimmer in either the roof, the sidewall structure, or both, and positioned to transfer heat to the molten mass of glass without substantial interference from foamed material. Certain embodiments include increased height of glass-contact refractory, in particular immediately upstream of the skimmers.

68 Claims, 6 Drawing Sheets

(56) References Cited

U.S. PATENT DOCUMENTS 2,432,942 A 12/1947 See et al.
2,455,907 A 1/1948 Slayter
2,513,732 A * 7/1950 Mols ..... C03B 5/04 65/346
2,539,145 A * 1/1951 Light ..... C03B 5/24 236/15 BE
2,679,749 A 6/1954 Poole
2,718,096 A 9/1955 Henry et al.
2,735,229 A * 2/1956 Honiss ..... C03B 7/06 432/238
2,773,545 A 12/1956 Petersen
2,781,756 A 2/1957 Kobe
2,878,644 A 3/1959 Fenn
2,890,166 A 6/1959 Heinze
2,902,029 A 9/1959 Hill
2,981,250 A 4/1961 Stewart
3,004,367 A * 10/1961 Hummel et al. ..... C03B 5/262 65/165
3,020,165 A 2/1962 Davis
3,024,121 A * 3/1962 Hagedorn ..... 501/71
3,056,283 A 10/1962 Tiede
3,073,683 A 1/1963 Switzer et al.
3,084,392 A 4/1963 Labino
3,088,812 A 5/1963 Bitterlich et al.
3,104,947 A 9/1963 Switzer et al.
3,160,578 A 12/1964 Saxton et al.
3,165,452 A 1/1965 Williams
3,170,781 A 2/1965 Keefer
3,174,820 A 3/1965 See et al.
3,215,189 A 11/1965 Bauer
3,224,855 A 12/1965 Plumat
3,237,929 A 3/1966 Plumat et al.
3,241,548 A 3/1966 See et al.
3,248,205 A 4/1966 Dolf et al.
3,260,587 A 7/1966 Dolf et al.
3,268,313 A 8/1966 Burgman et al.
3,285,834 A 11/1966 Guerrieri et al.
3,294,512 A 12/1966 Penberthy
3,325,298 A 6/1967 Brown
3,385,686 A 5/1968 Plumat et al.
3,402,025 A 9/1968 Garrett et al.
3,407,805 A 10/1968 Bougard
3,407,862 A 10/1968 Mustian, Jr.
3,432,399 A 3/1969 Schutt
3,445,214 A 5/1969 Oremesher
3,463,626 A * 8/1969 LeBlanc ..... C03B 5/173 501/71
3,463,627 A * 8/1969 LeBlanc ..... C03B 5/173 501/132
3,498,779 A 3/1970 Hathaway
3,510,393 A 5/1970 Burgman et al.
3,523,779 A * 8/1970 Keshari et al. ..... 65/134.3
3,525,674 A 8/1970 Barnebey
3,533,770 A 10/1970 Adler et al.
3,563,683 A 2/1971 Hess
3,592,151 A 7/1971 Webber
3,592,623 A * 7/1971 Shepherd ..... C03B 5/202 65/134.4
3,606,825 A 9/1971 Johnson
3,617,234 A * 11/1971 Hawkins et al. ... B01F 13/0272 65/134.4
3,627,504 A 12/1971 Johnson et al.
3,692,017 A 9/1972 Glachant et al.
3,738,792 A 6/1973 Feng
3,746,527 A 7/1973 Knavish et al.
3,747,588 A 7/1973 Booth
3,756,800 A 9/1973 Phaneuf
3,763,915 A 10/1973 Perry et al.
3,764,287 A 10/1973 Brocious
3,771,988 A 11/1973 Starr
3,818,893 A 6/1974 Kataoka et al.
3,835,909 A 9/1974 Douglas et al.
3,840,002 A 10/1974 Douglas et al.
3,856,496 A 12/1974 Nesbitt et al.
3,885,945 A 5/1975 Rees et al.
3,907,585 A 9/1975 Francel et al.
3,913,560 A 10/1975 Lazarre et al.
3,929,445 A 12/1975 Zippe
3,951,635 A 4/1976 Rough
3,976,464 A * 8/1976 Wardlaw ..... C03B 5/205 65/337
4,004,903 A 1/1977 Daman et al.
4,083,711 A 4/1978 Jensen
4,110,098 A 8/1978 Mattmuller
4,153,438 A 5/1979 Stream
4,185,982 A 1/1980 Schwenninger
4,203,761 A 5/1980 Rose
4,205,966 A 6/1980 Horikawa
4,226,564 A 10/1980 Takahashi et al.
4,238,226 A 12/1980 Sanzenbacher et al.
4,249,927 A 2/1981 Fakuzaki et al.
4,270,740 A 6/1981 Sanzenbacher et al.
4,282,023 A 8/1981 Hammel et al.
4,303,435 A 12/1981 Sleighter
4,323,718 A 4/1982 Buhring et al.
4,349,376 A * 9/1982 Dunn et al. ..... C03B 5/23 65/337
4,406,683 A 9/1983 Demarest
4,413,882 A 11/1983 Bailey et al.
4,488,537 A 12/1984 Laurent
4,539,034 A 9/1985 Hanneken
4,542,106 A 9/1985 Sproull
4,545,800 A 10/1985 Won et al.
4,626,199 A 12/1986 Bounini
4,632,687 A 12/1986 Kunkle et al.
4,634,461 A 1/1987 Demarest, Jr. et al.
4,657,586 A 4/1987 Masterson et al.
4,735,642 A 4/1988 Jensen et al.
4,738,938 A 4/1988 Kunkle et al.
4,758,259 A 7/1988 Jensen
4,798,616 A 1/1989 Knavish et al.
4,814,387 A 3/1989 Donat
4,816,056 A 3/1989 Tsai et al.
4,877,436 A 10/1989 Sheinkop
4,877,449 A 10/1989 Khinkis
4,878,829 A 11/1989 Anderson
4,882,736 A * 11/1989 Pieper ..... 373/32
4,927,886 A 5/1990 Backderf et al.
4,953,376 A 9/1990 Merlone
5,032,230 A 7/1991 Shepherd
5,052,874 A 10/1991 Johanson
5,062,789 A 11/1991 Gitman
5,097,802 A 3/1992 Clawson
5,168,109 A 12/1992 Backderf et al.
5,169,424 A 12/1992 Grinnen et al.
5,199,866 A 4/1993 Joshi et al.
5,204,082 A 4/1993 Schendel
5,299,929 A 4/1994 Yap
5,360,171 A 11/1994 Yap
5,374,595 A 12/1994 Dumbaugh et al.
5,405,082 A 4/1995 Brown et al.
5,412,882 A 5/1995 Zippe et al.
5,449,286 A 9/1995 Snyder et al.
5,483,548 A 1/1996 Coble
5,490,775 A 2/1996 Joshi et al.
5,522,721 A 6/1996 Drogue et al.
5,526,580 A 6/1996 Zippe et al.
5,545,031 A 8/1996 Joshi et al.
5,575,637 A 11/1996 Slavejkov et al.
5,595,703 A 1/1997 Swaelens et al.
5,606,965 A 3/1997 Panz et al.
5,613,994 A 3/1997 Muniz et al.
5,615,668 A 4/1997 Panz et al.
5,636,623 A 6/1997 Panz et al.
5,672,827 A 9/1997 Jursich
5,713,668 A 2/1998 Lunghofer et al.
5,718,741 A 2/1998 Hull et al.
5,736,476 A 4/1998 Watzke et al.
5,743,723 A 4/1998 Iatrides et al.
5,765,964 A 6/1998 Calcote et al.
5,814,121 A 9/1998 Travis
5,829,962 A 11/1998 Drasek et al.
5,833,447 A 11/1998 Bodelin et al.

(56) References Cited

U.S. PATENT DOCUMENTS 5,849,058 A 12/1998 Takeshita et al.
5,863,195 A 1/1999 Feldermann
5,887,978 A 3/1999 Lunghofer et al.
5,944,507 A 8/1999 Feldermann
5,944,864 A 8/1999 Hull et al.
5,954,498 A 9/1999 Joshi et al.
5,975,886 A 11/1999 Philippe
5,979,191 A 11/1999 Jian
5,984,667 A 11/1999 Philippe et al.
5,993,203 A 11/1999 Koppang
6,029,910 A 2/2000 Joshi et al.
6,036,480 A 3/2000 Hughes et al.
6,039,787 A 3/2000 Edlinger
6,045,353 A 4/2000 VonDrasek et al.
6,068,468 A 5/2000 Philippe et al.
6,071,116 A 6/2000 Philippe et al.
6,074,197 A 6/2000 Philippe
6,077,072 A 6/2000 Marin et al.
6,085,551 A 7/2000 Pieper et al.
6,109,062 A 8/2000 Richards
6,113,389 A 9/2000 Joshi et al.
6,116,896 A 9/2000 Joshi et al.
6,120,889 A 9/2000 Turner et al.
6,123,542 A 9/2000 Joshi et al.
6,126,438 A 10/2000 Joshi et al.
6,154,481 A * 11/2000 Sorg et al. ..... C03B 5/04 373/30
6,156,285 A 12/2000 Adams et al.
6,171,100 B1 1/2001 Joshi et al.
6,210,151 B1 4/2001 Joshi et al.
6,210,703 B1 4/2001 Novich
6,237,369 B1 5/2001 LeBlanc et al.
6,241,514 B1 6/2001 Joshi et al.
6,244,197 B1 6/2001 Coble
6,244,857 B1 6/2001 VonDrasek et al.
6,247,315 B1 6/2001 Marin et al.
6,250,136 B1 6/2001 Igreja
6,250,916 B1 6/2001 Philippe et al.
6,274,164 B1 8/2001 Novich
6,276,924 B1 8/2001 Joshi et al.
6,276,928 B1 8/2001 Joshi et al.
6,293,277 B1 9/2001 Panz et al.
6,314,760 B1 11/2001 Chenoweth
6,314,896 B1 11/2001 Marin et al.
6,338,337 B1 1/2002 Panz et al.
6,344,747 B1 2/2002 Lunghofer et al.
6,357,264 B1 3/2002 Richards
6,386,271 B1 5/2002 Kawamoto et al.
6,418,755 B2 7/2002 Chenoweth
6,422,041 B1 7/2002 Simpson et al.
6,454,562 B1 9/2002 Joshi et al.
6,460,376 B1 10/2002 Jeanvoine et al.
6,536,651 B2 3/2003 Ezumi et al.
6,558,606 B1 5/2003 Kulkarni et al.
6,660,106 B1 12/2003 Babel et al.
6,694,791 B1 2/2004 Johnson et al.
6,701,617 B2 3/2004 Li et al.
6,705,118 B2 3/2004 Simpson et al.
6,708,527 B1 3/2004 Ibarlucea et al.
6,711,942 B2 3/2004 Getman et al.
6,715,319 B2 * 4/2004 Barrow et al. ..... 65/134.9
6,722,161 B2 4/2004 LeBlanc
6,736,129 B1 5/2004 Smith
6,739,152 B2 5/2004 Jeanvoine et al.
6,796,147 B2 9/2004 Borysowicz et al.
6,797,351 B2 9/2004 Kulkarni et al.
6,854,290 B2 2/2005 Hayes et al.
6,857,999 B2 2/2005 Jeanvoine
6,883,349 B1 4/2005 Jeanvoine
6,909,075 B2 * 6/2005 Jakes et al. ..... 219/701
6,918,256 B2 7/2005 Gutmark et al.
7,027,467 B2 4/2006 Baev et al.
7,116,888 B1 10/2006 Aitken et al.
7,134,300 B2 11/2006 Hayes et al.
7,168,395 B2 1/2007 Engdahl
7,175,423 B1 2/2007 Pisano et al.
7,231,788 B2 6/2007 Karetta et al.
7,273,583 B2 9/2007 Rue et al.
7,383,698 B2 6/2008 Ichinose et al.
7,392,668 B2 * 7/2008 Adams et al. ..... C03B 7/06 432/247
7,428,827 B2 9/2008 Maugendre et al.
7,441,686 B2 10/2008 Odajima et al.
7,448,231 B2 11/2008 Jeanvoine et al.
7,454,925 B2 11/2008 DeAngelis et al.
7,509,819 B2 * 3/2009 Baker et al. ..... C03B 7/065 432/247
7,565,819 B2 7/2009 Jeanvoine et al.
7,578,988 B2 8/2009 Jacques et al.
7,581,948 B2 9/2009 Borders et al.
7,622,677 B2 11/2009 Barberree et al.
7,624,595 B2 12/2009 Jeanvoine et al.
7,748,592 B2 7/2010 Koga et al.
7,767,606 B2 8/2010 McGinnis et al.
7,778,290 B2 8/2010 Sacks et al.
7,781,562 B2 8/2010 Crawford et al.
7,802,452 B2 9/2010 Borders et al.
7,832,365 B2 11/2010 Hannum et al.
7,845,314 B2 12/2010 Smith
7,855,267 B2 12/2010 Crawford et al.
8,033,254 B2 10/2011 Hannum et al.
8,279,899 B2 10/2012 Kitabayashi
8,285,411 B2 10/2012 Hull et al.
8,650,914 B2 2/2014 Charbonneau
8,707,739 B2 4/2014 Huber et al.
8,707,740 B2 4/2014 Huber et al.
8,875,544 B2 11/2014 Charbonneau
8,973,400 B2 3/2015 Charbonneau et al.
8,997,525 B2 4/2015 Shock et al.
2002/0086077 A1 7/2002 Noller et al.
2002/0134112 A1 * 9/2002 Barrow et al. ..... 65/134.4
2002/0152770 A1 10/2002 Becher et al.
2002/0162358 A1 11/2002 Jeanvoine et al.
2002/0166343 A1 11/2002 LeBlanc
2003/0015000 A1 1/2003 Hayes et al.
2003/0029197 A1 2/2003 Jeanvoine et al.
2003/0037571 A1 2/2003 Kobayashi et al.
2004/0056026 A1 * 3/2004 Jakes et al. ..... 219/701
2004/0131988 A1 7/2004 Baker et al.
2004/0168474 A1 9/2004 Jeanvoine et al.
2004/0224833 A1 11/2004 Jeanvoine et al.
2005/0039491 A1 2/2005 Maugendre et al.
2005/0103323 A1 5/2005 Engdal
2005/0236747 A1 10/2005 Rue et al.
2006/0000239 A1 1/2006 Jeanvoine et al.
2006/0174655 A1 8/2006 Kobayashi et al.
2006/0233512 A1 10/2006 Aitken et al.
2006/0257097 A1 11/2006 Aitken et al.
2006/0287482 A1 12/2006 Crawford et al.
2006/0293494 A1 12/2006 Crawford et al.
2006/0293495 A1 12/2006 Crawford et al.
2007/0106054 A1 5/2007 Crawford et al.
2007/0122332 A1 5/2007 Jacques et al.
2007/0130994 A1 6/2007 Boratav et al.
2007/0212546 A1 9/2007 Jeanvoine et al.
2007/0220922 A1 9/2007 Bauer et al.
2008/0035078 A1 2/2008 Li
2008/0227615 A1 9/2008 McGinnis et al.
2008/0256981 A1 10/2008 Jacques et al.
2008/0276652 A1 11/2008 Bauer et al.
2008/0293857 A1 11/2008 Crawford et al.
2009/0042709 A1 2/2009 Jeanvoine et al.
2009/0220899 A1 9/2009 Spangelo et al.
2010/0064732 A1 3/2010 Jeanvoine et al.
2010/0087574 A1 4/2010 Crawford et al.
2010/0089383 A1 4/2010 Cowles
2010/0120979 A1 5/2010 Crawford et al.
2010/0143601 A1 6/2010 Hawtof et al.
2010/0227971 A1 9/2010 Crawford et al.
2010/0236323 A1 9/2010 D'Angelico et al.
2010/0300153 A1 12/2010 Zhang et al.
2010/0304314 A1 12/2010 Rouchy et al.
2010/0307196 A1 12/2010 Richardson
2010/0326137 A1 12/2010 Rouchy et al.

(56) References Cited

U.S. PATENT DOCUMENTS

| | | | | |
|---|---|---|---|---|
| 2011/0054091 | A1 | 3/2011 | Crawford et al. | |
| 2011/0061642 | A1 | 3/2011 | Rouchy et al. | |
| 2011/0088432 | A1 | 4/2011 | Purnode et al. | |
| 2011/0107670 | A1 | 5/2011 | Galley et al. | |
| 2011/0236846 | A1 | 9/2011 | Rue et al. | |
| 2011/0308280 | A1 | 12/2011 | Huber | |
| 2012/0077135 | A1 | 3/2012 | Charbonneau | |
| 2012/0104306 | A1 | 5/2012 | Kamiya et al. | |
| 2013/0086944 | A1 | 4/2013 | Shock et al. | |
| 2013/0086951 | A1 | 4/2013 | Charbonneau et al. | |
| 2013/0086952 | A1 | 4/2013 | Charbonneau et al. | |
| 2013/0283861 | A1 | 10/2013 | Mobley et al. | |
| 2013/0327092 | A1 | 12/2013 | Charbonneau | |
| 2014/0090423 | A1* | 4/2014 | Charbonneau | C03B 5/04 65/134.5 |
| 2014/0144185 | A1* | 5/2014 | Shock | C03B 5/20 65/134.9 |

FOREIGN PATENT DOCUMENTS

| | | | | |
|---|---|---|---|---|
| DE | 4000358 | A1 | | 9/1990 |
| DE | 19619919 | | | 8/1997 |
| DE | 10029983 | | | 9/2003 |
| DE | 102005033330 | | | 8/2006 |
| EP | 0181248 | | | 10/1989 |
| EP | 1337789 | | | 12/2004 |
| EP | 1990321 | | | 11/2008 |
| EP | 2133315 | | | 12/2009 |
| EP | 2138465 | A2 | | 12/2009 |
| EP | 1986966 | | | 4/2010 |
| EP | 1667934 | | | 2/2011 |
| EP | 2404880 | A | | 1/2012 |
| EP | 2578548 | | | 4/2013 |
| FR | 2740860 | | | 9/1997 |
| GB | 191301772 | | | 1/1914 |
| GB | 191407633 | | | 3/1914 |
| GB | 164073 | | | 5/1921 |
| IT | 1208172 | | | 6/1989 |
| JP | 58026039 | A | * | 2/1983 |
| JP | 58045128 | A | * | 3/1983 |
| JP | 04353606 | A | * | 12/1992 |
| KR | 465272 | | | 12/2004 |
| RO | 114827 | | | 7/1999 |
| WO | WO 9855411 | | | 12/1998 |
| WO | WO 2008103291 | | | 8/2008 |
| WO | WO 2009091558 | | | 7/2009 |
| WO | WO 2010011701 | | | 1/2010 |
| WO | WO 2010045196 | | | 4/2010 |

OTHER PUBLICATIONS

"Glass Technologies—The Legacy of a Successful Public-Private Partnership", 2007, U.S. Department of Energy, pp. 1-32.

Furman, BJ, ME 120 Experimental Methods, "Vibration Measurement", San Jose University Department of Mechanical and Aerospace Engineering, Nov. 22, 2005, 14 pgs.

Higley, BA, "Glass Melter System Technologies for Vitrification of High-Sodium Content Low-Level, Radioactive, Liquid Wastes—Phase I: SBS Demonstration With Simulated Low-Level Waste—Final Test Report", Westinghouse Hanford Company, Sep. 1, 1995, 296 pgs.

Olabin, V.M. et al, "Submerged Combustion Furnace for Glass Melts," Ceramic Engineering and Science Proceedings, Jan. 1, 1996, pp. 84-92, vol. 17—No. 2, American Ceramic Society Inc. US.

Ross, C. Philip et al., "Glass Melting Technology: A Technical and Economic Assessment", Oct. 2004, U.S. Department of Energy—Industrial Technologies Program, pp. 1-292.

Rue, David, "Energy-Efficient Glass Melting—The Next Generation Melter", Gas Technology Institute, Project No. 20621, Final Report, Mar. 2008, 82 pgs.

Thor Treatment Technologies, LLC, "Report for Treating Hanford LAW and WTP SW Simulants: Pilot Plant Mineralizing Flowsheet", Apr. 2009, Department of Energy Environmental Management Consolidated Business Center, 250 pgs.

U.S. Appl. No. 12/817,754, filed Jun. 17, 2010, Huber.

U.S. Appl. No. 12/888,970, filed Sep. 23, 2010, Charbonneau.

U.S. Appl. No. 13/268,065, filed Oct. 7, 2011, Charbonneau et al.

U.S. Appl. No. 13/268,130, filed Oct. 7, 2011, Charbonneau et al.

U.S. Appl. No. 13/458,211, filed Apr. 27, 2012, Mobley et al.

* cited by examiner

APPARATUS, SYSTEMS AND METHODS FOR CONDITIONING MOLTEN GLASS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application may be related to assignee's U.S. non-provisional patent application Ser. No. 13/268,130, filed Oct. 7, 2011, and to assignee's U.S. non-provisional patent application Ser. No. 13/458,211, filed April 27, which are both incorporated by reference herein.

BACKGROUND INFORMATION

1. Technical Field

The present disclosure relates generally to the field of combustion furnaces and methods of use to produce glass, and more specifically to systems and methods for reducing foam or its impact during manufacture of glass using submerged combustion melters.

2. Background Art

Submerged combustion melting (SCM) involves melting glass batch materials to produce molten glass by passing oxygen, oxygen-air mixtures or air along with a liquid, gaseous fuel, or particulate fuel in the glass batch, directly into a molten pool of glass usually through burners submerged in a glass melt pool. The introduction of high flow rates of oxidant and fuel into the molten glass, and the expansion of the gases cause rapid melting of the glass batch and much turbulence.

One drawback to submerged combustion is the tendency of the molten glass to foam. The foam may stabilize in a top layer when the molten mass is routed through conventional conditioning and/or distribution channels/systems downstream of the submerged combustion melter. The foam layer may impede the ability to apply heat to the glass using combustion burners to achieve or maintain temperature and compositional homogeneity of the molten glass, and may also impede the rate at which further bubbles in the melt rise and thus effect expulsion of the bubbles and mass flow rate of the melt in the channels. In extreme cases, the foam generated may interfere with the traditional energy application methods employed, which may cause systems to require shutdown, maintenance and may result in a process upset. Attempts to reduce the foam problem through process adjustments have not met with complete success in reducing foam to an acceptable amount.

It would be an advance in the glass manufacturing art if foam could be reduced, or the effect of the foam reduced, during conditioning of molten glass manufactured using a submerged combustion melter and methods.

SUMMARY

In accordance with the present disclosure, apparatus, systems and methods are described which reduce or overcome one or more of the above problems.

A first aspect of the disclosure is an apparatus comprising:

a flow channel defined by a floor, a roof, and a wall structure connecting the floor and roof;

the flow channel divided into a plurality of serial sections by a series of skimmers extending generally substantially vertically downward a portion of a distance between the roof and floor;

one or more high momentum combustion burners positioned immediately upstream of each skimmer in either the roof or sidewall structure, or both, to burst at least some foamed material retained behind the skimmers and floating on top of a molten mass of glass flowing in the flow channel by heat and/or direct impingement thereon; and one or more low momentum combustion burners positioned immediately downstream of each skimmer in either the roof, the sidewall structure, or both, and positioned to transfer heat to the molten mass of glass without substantial interference from the foamed material.

A second aspect of the disclosure is a system comprising:

a submerged combustion melter comprising a floor, a roof, a wall structure connecting the floor and roof, a melting zone being defined by the floor, roof and wall structure, and a plurality of burners, at least some of which are positioned to direct combustion products into the melting zone under a level of molten glass in the melting zone and form a turbulent molten glass, the melter vessel comprising a batch feeder attached to the wall or roof above the level, and an exit end comprising a melter exit structure for discharging the molten glass, the melter exit structure fluidly and mechanically connecting the melter vessel to a molten glass conditioning channel, the melter configured to produce an initial foamy molten glass having a density and comprising bubbles, at least some of the bubbles forming a bubble layer on top of the foamy molten glass;

the molten glass conditioning channel comprising:

a flow channel defined by a channel floor, a channel roof, and a channel wall structure connecting the channel floor and channel roof;

the flow channel divided into a plurality of serial sections by a series of skimmers extending generally substantially vertically downward a portion of a distance between the channel roof and channel floor;

one or more high momentum combustion burners positioned immediately upstream of each skimmer in either the channel roof or channel sidewall structure, or both, to burst at least some foamed material retained behind the skimmers and floating on top of the molten mass of glass flowing in the flow channel by heat and/or direct impingement thereon; and one or more low momentum combustion burners positioned immediately downstream of each skimmer in either the channel roof, the channel sidewall structure, or both, and positioned to transfer heat to the molten mass of glass without substantial interference from the foamed material.

A third aspect of the disclosure is a method comprising:

a) routing an initial foamy molten glass into a conditioning channel, the initial foamy molten glass having a density and comprising bubbles, at least some of the bubbles forming a bubble layer on top of the foamy molten glass, the conditioning channel comprising a flow channel defined by a channel floor, a channel roof, and a channel wall structure connecting the channel floor and channel roof, the flow channel divided into a plurality of serial sections by a series of skimmers extending generally substantially vertically downward a portion of a distance between the channel roof and channel floor;

b) positioning one or more high momentum combustion burners immediately upstream of each skimmer in either the channel roof or channel sidewall structure, or both;

c) operating the high momentum burners to route combustion products from the high momentum burners to impact at least a portion of bubbles in the bubble layer on the foamy molten glass retained behind the skimmers with sufficient force and/or heat to burst at least some of the bubbles; and d) positioning one or more low momentum combustion burners immediately downstream of each skimmer in either the channel roof, the channel sidewall structure, or both; and e) operating the low momentum burners to route combustion products from the low momentum burners to transfer heat to the molten mass of glass without substantial interference from the foamed material.

A fourth aspect of the disclosure is a method comprising:

a) melting glass-forming materials in a submerged combustion melter comprising a floor, a roof, and a wall structure connecting the floor and roof, the melter comprising one or more submerged combustion burners and a molten glass outlet, producing an initial foamy molten glass having a density and comprising bubbles, at least some of the bubbles forming a bubble layer on top of the foamy molten glass;

b) routing the initial foamy molten glass into a conditioning channel, the conditioning channel comprising a flow channel defined by a channel floor, a channel roof, and a channel wall structure connecting the channel floor and channel roof, the flow channel divided into a plurality of serial sections by a series of skimmers extending generally substantially vertically downward a portion of a distance between the channel roof and channel floor;

c) positioning one or more high momentum combustion burners immediately upstream of each skimmer in either the channel roof or channel sidewall structure, or both;

d) operating the high momentum burners to route combustion products from the high momentum burners to impact at least a portion of bubbles in the bubble layer on the foamy molten glass retained behind the skimmers with sufficient force and/or heat to burst at least some of the bubbles;

e) positioning one or more low momentum combustion burners immediately downstream of each skimmer in either the channel roof, the channel sidewall structure, or both; and f) operating the low momentum burners to route combustion products from the low momentum burners to transfer heat to the molten mass of glass without substantial interference from the foamed material.

Apparatus, systems and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1:
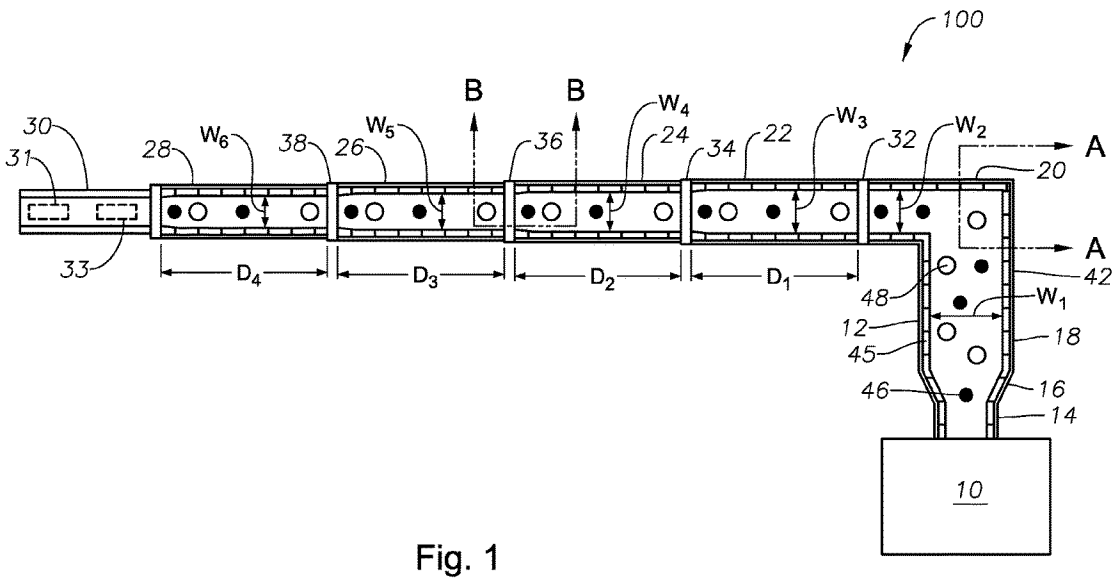
FIG. 1 is a schematic plan view of one embodiment of a glass conditioning channel apparatus and system in accordance with this disclosure.

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed systems and methods. However, it will be understood by those skilled in the art that the systems and methods covered by the claims may be practiced without these details and that numerous variations or modifications from the specifically described embodiments may be possible and are deemed within the claims. All U.S. published patent applications and U.S. patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, one drawback to submerged combustion is the tendency of the molten glass to foam, either from glass-forming reactions, combustion products, or both. The foam may stabilize in a top layer when the molten mass is routed through equipment downstream of the submerged combustion melter, such as forehearths, conditioning channels, distribution channels, and the like. Attempts to reduce the foam problem through process adjustments have not met with complete success in reducing foam to an acceptable amount.

Applicants have discovered apparatus, systems and methods that may reduce or eliminate such problems.

Various terms are used throughout this disclosure. "Submerged" as used herein means that combustion gases emanate from combustion burners under the level of the molten glass; the burners may be floor-mounted, wall-mounted, or in melter embodiments comprising more than one submerged combustion burner, any combination thereof (for example, two floor mounted burners and one wall mounted burner).

The terms "foam" and "foamy" include froths, spume, suds, heads, fluffs, fizzes, lathers, effervesces, layer and the like. The term "bubble" means a thin, shaped, gas-filled film of molten glass. The shape may be spherical, hemispherical, rectangular, ovoid, and the like. Gas in the gas-filled bubbles may comprise oxygen or other oxidants, nitrogen, argon, noble gases, combustion products (including but not limited to, carbon dioxide, carbon monoxide, $NO_x$, $SO_x$, $H_2S$, and water), reaction products of glass-forming ingredients (for example, but not limited to, sand (primarily $SiO_2$), clay, limestone (primarily $CaCO_3$), burnt dolomitic lime, borax and boric acid, and the like. Bubbles may include solids particles, for example soot particles, either in the film, the gas inside the film, or both.

As used herein the term "combustion gases" means substantially gaseous mixtures of combusted fuel, any excess oxidant, and combustion products, such as oxides of carbon (such as carbon monoxide, carbon dioxide), oxides of nitrogen, oxides of sulfur, and water. Combustion products may include liquids and solids, for example soot and unburned liquid fuels.

"Oxidant" as used herein includes air and gases having the same molar concentration of oxygen as air, oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen. Oxidants may be supplied from a pipeline, cylinders, storage facility, cryogenic air separation unit, membrane permeation separator, or adsorption unit.

The term "fuel", according to this disclosure, means a combustible composition comprising a major portion of, for example, methane, natural gas, liquefied natural gas, propane, atomized oil or the like (either in gaseous or liquid form). Fuels useful in the disclosure may comprise minor amounts of non-fuels therein, including oxidants, for purposes such as premixing the fuel with the oxidant, or atomizing liquid fuels. As used herein the term "fuel" includes gaseous fuels, liquid fuels, flowable solids, such as powdered carbon or particulate material, waste materials, slurries, and mixtures or other combinations thereof. When the fuel comprises gaseous fuel, the gaseous fuel may be selected from the group consisting of methane, natural gas, liquefied natural gas, propane, carbon monoxide, hydrogen, steam-reformed natural gas, atomized oil or mixtures thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

A "flow channel" defined by a floor, a roof, and a wall structure connecting the floor and roof may have any operable cross-sectional shape, for example, but not limited to, rectangular, oval, circular, trapezoidal, hexagonal, and the like, and flow path shape, for example, but not limited to, straight, zigzag, curved, and combinations thereof. The phrase "substantially vertically downward" when referring to a skimmer means the portion of the skimmer attached to a roof section or between roof sections may make an angle with the roof of 90 degrees, or the angle may vary ranging from about 45 to about 135 degrees, or from about 75 degrees to about 105 degrees.

Conduits used in burners useful in the systems and methods of the present disclosure may be comprised of metal, ceramic, ceramic-lined metal, or combination thereof. Suitable metals include stainless steels, for example, but not limited to, 306 and 316 steel, as well as titanium alloys, aluminum alloys, and the like. Suitable materials for the glass-contact refractory, which may be present in SC melters and channel sections, and refractory burner blocks (if used) include fused zirconia ($ZrO_2$), fused cast AZS (alumina-zirconia-silica), rebonded AZS, or fused cast alumina ($Al_2O_3$). The melter, channel, and burner geometry, and type of glass to be produced may dictate the choice of a particular material, among other parameters.

The terms "cooled" and "coolant" may include use of any heat transfer fluid and may be any gaseous, liquid, or some combination of gaseous and liquid composition that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from liquids that may be organic, inorganic, or some combination thereof, for example, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons.

Certain burners useful in apparatus, systems and methods of this disclosure may be fluid-cooled, and may include first and second concentric conduits, the first conduit fluidly connected at one end to a source of fuel, the second conduit fluidly connected to a source of oxidant, and a third substantially concentric conduit comprising a first end, a second end, and an internal surface, the internal surface of the third conduit forming, with an exterior surface of the second conduit, a secondary annulus external to a primary annulus between the first and second conduits. The first end of the third conduit may extend beyond the first end of the second conduit, the first end of the second conduit may extend beyond the first end of the first conduit, and the secondary annulus may be capped by an end cap connecting the first end of the second conduit and the first end of the third conduit.

In certain systems one or more of the non-submerged burners may comprise a fuel inlet conduit having an exit nozzle, the conduit and nozzle inserted into a cavity of a ceramic burner block, the ceramic burner block in turn inserted into either the roof or the wall structure, or both the roof and wall structure.

In certain systems, one or more of the non-submerged burners may be adjustable with respect to direction of flow of the combustion products. Adjustment may be via automatic, semi-automatic, or manual control. Certain system embodiments may comprise a burner mount that mounts the burner in the wall structure or roof of the channel comprising a refractory, or refractory-lined ball joint. Other burner mounts may comprise rails mounted in slots in the wall or roof. In yet other embodiments the non-submerged burners may be mounted outside of the melter or channel, on supports that allow adjustment of the combustion products flow direction. Useable supports include those comprising ball joints, cradles, rails, and the like.

As used herein the phrase "high momentum" combustion burners means burners configured to have a fuel velocity ranging from about 150 ft./second to about 1000 ft./second (about 46 meters/second to about 305 meters/second) and an oxidant velocity ranging from about 150 ft./second to about 1000 ft./second (about 46 meters/second to about 305 meters/second). As used herein the phrase "low momentum" combustion burners means burners configured to have a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second). When referring to one or more high momentum burners "positioned immediately upstream" of a skimmer, this means that each channel section may have in either the roof or sidewall structure, or both, sufficient high momentum burners to produce flame and/or combustion products streams that are able to burst at least some foamed material, by heat and/or direct impingement thereon, retained behind the skimmers and floating on top of a molten mass of glass flowing in the flow channel within about 12 inches (about 30 cm) upstream of the skimmer. When referring to one or more low momentum burners "positioned immediately downstream" of a skimmer, this means that each channel section may have in either the roof or sidewall structure, or both, sufficient low momentum burners to produce flame and/or combustion products streams that are able to transfer heat to the molten mass of glass flowing in the flow channel within about 12 inches (about 30 cm) downstream of the skimmer. The fuel and oxidant velocities may be the same or different in a given burner, and from burner to burner.

In certain systems and methods the downstream component may be selected from the group consisting of a conditioning channel, a distribution channel, and a forehearth.

Certain system and method embodiments of this disclosure may include submerged combustion melters comprising fluid-cooled panels such as disclosed in assignee's co-pending U.S. patent application Ser. No. 12/817,754, filed Jun. 17, 2010. In certain system and method embodiments, the submerged combustion melter may include one or more adjustable flame submerged combustion burners comprising one or more oxy-fuel combustion burners, such as described in assignee's co-pending United States (US) patent application Ser. No. 13/268,028, filed Oct. 7, 2011.

Certain system and method embodiments of this disclosure may be controlled by one or more controllers. For example, burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain systems and methods of this disclosure may also measure and/or monitor feed rate of batch or other feed materials, such as glass batch, cullet, mat or wound roving, mass of feed, and use these measurements for control purposes. Exemplary systems and methods of the disclosure may comprise a combustion controller which receives one or more input parameters selected from velocity of the fuel, velocity of oxidant, mass and/or volume flow rate of the fuel, mass and/or volume flow rate of oxidant, energy content of the fuel, temperature of the fuel as it enters the burner, temperature of the oxidant as it enters the burner, pressure of the oxidant entering the burner, humidity of the oxidant, burner geometry, oxidation ratio, temperature of the burner combustion products, temperature of melt, and combinations thereof, and may employ a control algorithm to control combustion temperature based on one or more of these input parameters.

Specific non-limiting apparatus, system and method embodiments in accordance with the present disclosure will now be presented in conjunction with FIGS. 1-8. The same numerals are used for the same or similar features in the various figures. In the views illustrated in FIGS. 1-6, it will be understood in each case that the figures are schematic in nature, and certain conventional features are not illustrated in order to illustrate more clearly the key features of each embodiment.

FIG. 1 is a schematic plan view, partially in cross-section, of one embodiment 100 of an apparatus and system of this disclosure. Illustrated schematically is a submerged combustion melter 10 fluidly and mechanically connected to a first conditioning channel section 12 through an exit structure 14 and a transition section 16. Exit structure may be, for example, but not limited to, a fluid-cooled exit structure as described in assignee's pending U.S. patent application Ser. No. 13/458,211, filed Apr. 27, 2012. First conditioning channel section 12 comprises first and second subsections 18 and 20 in embodiment 100. First channel section 12 includes a roof and floor (both not illustrated in FIG. 1, but illustrated in FIG. 2), and a sidewall structure comprised of an outer metal shell 42, non-glass-contact brick or other refractory wall 44, and glass-contact refractory as further described in context of FIG. 2. First section 12 of embodiment 100 is configured to promote a change of direction of flow of the molten mass of glass of 90 degrees in passing from first subsection 18 through second subsection 20. In various embodiments, the change of direction varies from between about 30 degrees to about 90 degrees.

Still referring to FIG. 1, the conditioning channel of embodiment 100 includes several sections, a second section 22, third section 24, fourth section 26, and fifth section 28 arranged in series, each section having a roof, floor, and sidewall structure connecting its roof and floor, and defining a flow channel for conditioning molten glass flowing there through. Sections 22, 24, 26, and 28 are divided by a series of skimmers, first skimmer 32, second skimmer 34, third skimmer 36, and fourth skimmer 38, each extending generally substantially vertically downward a portion of a distance between the roof and floor of the channel, with a final skimmer 40 positioned between fifth channel section 28 and a forehearth 30. The number of sections and the number of skimmers may each be more or less than five. Forehearth 30, which is not considered a part of the disclosure, may have one or more forming outlets denoted by dashed boxes 31, 33, on its underneath side, such as bushings, gob cutters, and the like, that are known in the art.

The conditioning channel of embodiment 100 includes one or more high momentum combustion burners, denoted strictly by position for clarity as solid darkened circles 46, positioned immediately upstream of each skimmer 32, 34, 36, 38, and 40 in the roof to burst at least some foamed material retained behind the skimmers and floating on top of a molten mass of glass flowing in the flow channel by heat and/or direct impingement thereon. As noted elsewhere herein, high momentum burners 46, also referred to as impingement burners, may alternately or additionally be positioned in section sidewall structures, or both in section roofs and section sidewall structures. In embodiment 100, a majority of high momentum combustion burners 46 are positioned along a centerline "CL" of the flow channel in the roof of each section, but this is not necessarily so in all embodiments and embodiment 100 includes at least two high momentum burners 46 that are not so positioned in channel first subsection 18.

The conditioning channel of embodiment 100 also includes one or more low momentum combustion burners, denoted strictly by position for clarity as open circles 48, positioned immediately downstream of each skimmer 32, 34, 36, 38, and 40 in the roof of each section to transfer heat to the molten mass of glass without substantial interference from the foamed material. As noted elsewhere herein, low momentum burners 48, also referred to as non-impingement burners, may alternately or in addition be positioned in section sidewall structures, or both in section roofs and section sidewall structures. In embodiment 100, a majority of low momentum combustion burners 48 are positioned along a centerline "CL" of the flow channel in the roof of each section, but this is not necessarily so in all embodiments, and embodiment 100 includes at least four low momentum burners 48 that are not so positioned in channel first subsection 18 and second subsection 20.

Referring again to FIG. 1, in embodiment 100 first subsection 18 has a flow channel $W_1$ width greater than a flow channel width $W_2$ of second subsection 20. In embodiment 100, each of the plurality of sections 22, 24, 26, and 28 has a flow channel width $W_3$, $W_4$, $W_5$, $W_6$, wherein $W_3>W_4>W_5>W_6$. If N represents the Nth flow channel section in the plurality of sections, in certain embodiments $W_1>W_2>W_3> \ldots W_N$. It is preferred that the flow channel width W be as wide as possible to promote long residence times for fining and large surface area for foam to collect (rise from within the molten glass and collect behind skimmers), however, this must be balanced against cost of constructing larger footprint apparatus and systems. Width W may range from about 100 inches (about 250 cm) near the SC melter, down to about 10 inches (about 25 cm) near the discharge from the last skimmer 40, or from about 90 inches (about 230 cm) near the SC melter down to about 12 inches (about 30 cm) near the discharge from skimmer 40.

In embodiment 100 skimmers are separated along a longitudinal length of the flow channel by a separation distance "D" of at least about 5 feet (152 cm), wherein the separation distance may be the same or different from section to section. In certain embodiments "D" is greater than or equal to about 5 feet (152 cm) and less than or equal to about 15 feet (456 cm).

Figure 2:
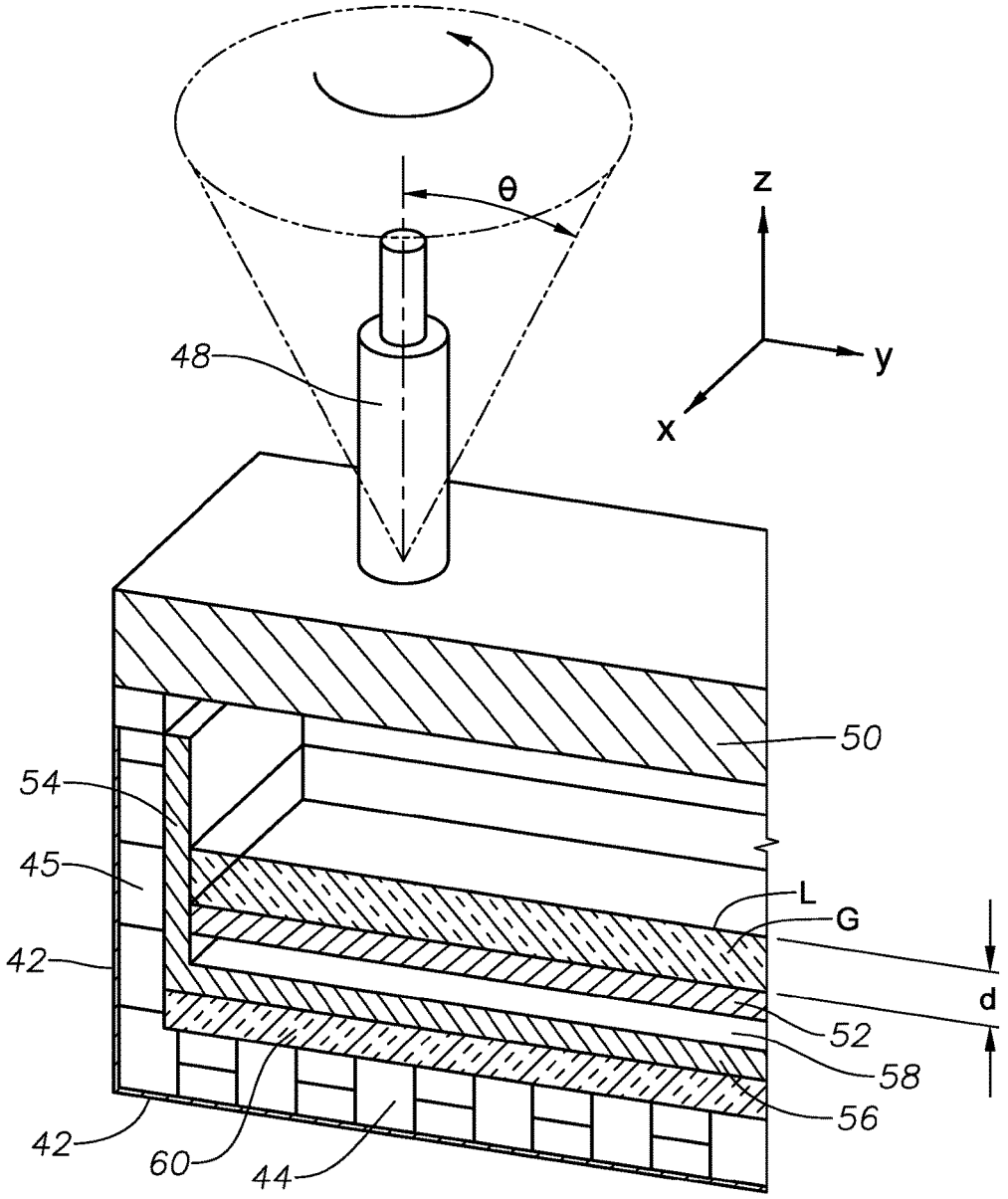
FIG. 2 is a schematic cross-sectional view along line A-A of FIG. 1.

FIG. 2 is a schematic perspective, partial cross-sectional view along line A-A of embodiment 100 of FIG. 1, illustrating the sidewall structure of each section has sufficient glass-contact refractory 54 to accommodate the operating depth or level "L" of molten mass of glass "G", wherein it is understood that level L denotes only the general level of liquid molten glass, and not the foam floating or accumulating thereon. In certain embodiments, sidewall 45 includes glass-contact refractory 54 able to accommodate molten glass depth "d" of no greater than about 10 inches (25.4 cm), in certain other embodiments no greater than about 5 inches (12.7 cm). As illustrated schematically in FIG. 2, the floor of each section may comprise a metal shell 42, a non-glass contact brick layer 44, a non-glass contact refractory support or insulating layer 60, a series of refractory layers 56, 58, and 52, wherein layer 52 may be a glass-contact refractory layer. Alternatively, in embodiment 100, layers 52 and 56 may define an open layer or cavity 58 for flow of a heating (or cooling) fluid. The thicknesses of materials or layers 42, 44, 45, 50 52, 54, 56, 58 and 60 depend on many factors, including the type of glass being produced, the material properties of the materials themselves, temperature and temperature homogeneity of molten glass desired or targeted, and the like.

Referring again to FIG. 2, illustrated schematically is a low momentum burner 48, illustrating that burners 48 and/or 48) may be adjusted or positioned to direct their flames and/or combustion products in a variety of directions, denoted generally by a cone angle θ, which may vary from 0 to about 45 degrees, in any direction from 0 to 360 degrees about the z-axis as denoted by the circular arrow about the longitudinal centerline of burner 48 (an x-y-z set of coordinate axis is provided for reference).

Figure 3:
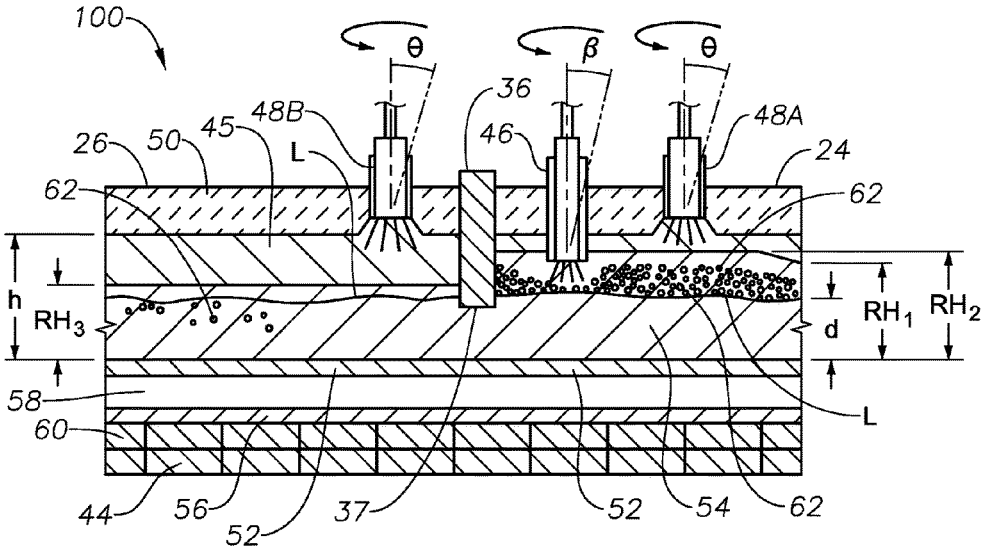
FIGS. 3 and 4 are cross-sectional views along line B-B of FIG. 1 illustrating schematically two embodiments of conditioning channels in accordance with the present disclosure.
Figure 4:
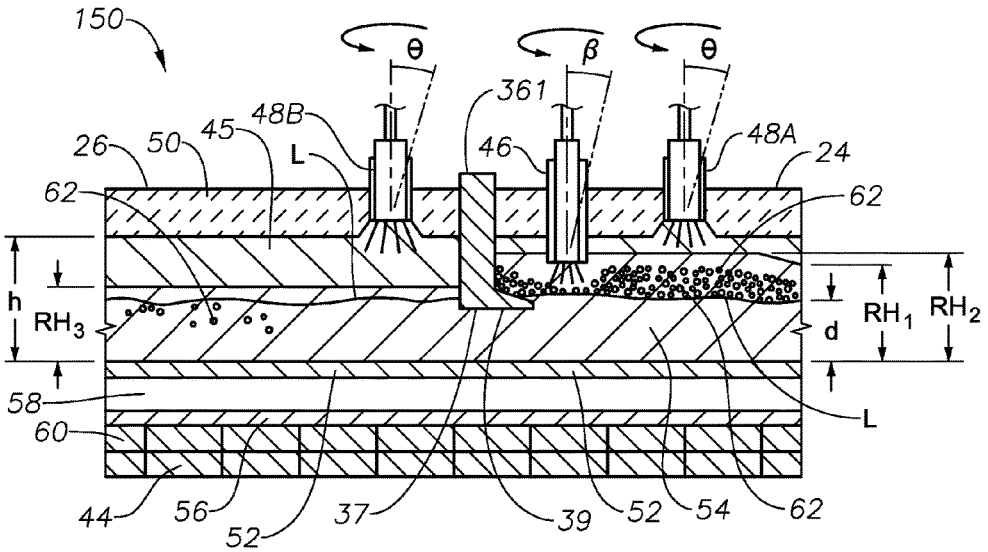
Figure 5:
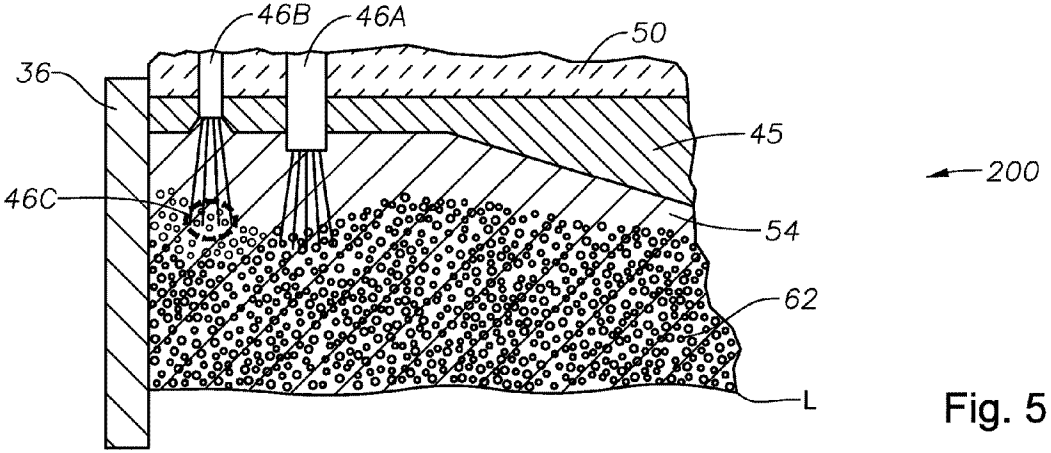
FIG. 5 is a schematic cross-sectional view of another channel embodiment useful in certain embodiments of systems and methods of the present disclosure.

An important aspect of the present disclosure is illustrated schematically in FIGS. 3, 4 and 5, which are cross-sectional views along line B-B of FIG. 1. FIGS. 3, 4, and 5 illustrate schematically three embodiments of conditioning channels in accordance with the present disclosure wherein the sidewall structures and floors of each section may be comprised of glass-contact refractory extending at least 2 inches (5.1 cm) above operating level L of molten glass upstream of each skimmer. Illustrated in FIGS. 3, 4 and 5 is skimmer 36 positioned generally between sections 24 and 26. Skimmer 36 has a distal end 37 that extends a sufficient fraction of the distance "h" (distance from roof to floor of a flow channel) so that distal end 37 is just below molten glass level L. Each section N has a height "$h_N$", and each skimmer may have a distal end 37 extending downward at least $0.5 \times h_N$; in any case the distal end of each skimmer is designed to extend below operating level L of the molten mass of glass. A high momentum burner 46 is illustrated impinging on bubbles 62, destroying some of the bubbles, while non-impinging low momentum burners 48A and 48B supply heat. Note that burner 48B is positioned to provide heat to the glass without substantial interference from bubbles 62. High momentum burners 46 may vary the position of their flame and/or combustion product in the same or similar manner as burner 48 illustrated schematically in FIG. 2, that is, angle β may vary from 0 to about 45 degrees, in any direction from 0 to 360 degrees about the z-axis. Note there are three heights of glass-contact refractory in this embodiment. Glass-contact refractory height $RH_1$ exemplifies the height of the glass-contact refractory in transition, increasing from a height such as height $RH_3$ to height $RH_2$, where height $RH_2$ is the height of glass-contact refractory in regions of high bubble volume. The height $RH_2$ is the height that may extend 2 inches or even 18 inches above the level of the molten glass L. The presence of this "extra" glass-contact refractory allows accommodation of foam floating on the molten glass in those regions. In certain embodiments wherein foaming is a particular problem, the sidewall structure's glass-contact refractory may extend at least 2 inches (5.1 cm) above the operating level of molten mass of glass L upstream of each skimmer, and in certain embodiments at least 18 inches (46 cm) above the operating level L of molten mass of glass upstream of each skimmer.

FIG. 4 illustrates schematically in cross-section an embodiment 150 similar to embodiment 100. Skimmer 361 of embodiment 150 includes a distal end 37 having a wing, ridge, or other appendage 39 protruding generally away from the body of skimmer 361 in the upstream direction. The purpose of embodiment 150 and skimmer 361 is primarily to emphasize that skimmers need not all be the same in a particular channel embodiment, and secondarily to illustrate other shapes of skimmers that may be useful in apparatus, systems, and methods of this disclosure. Other, structurally and functionally equivalent shapes and features for skimmers will become apparent to those of skill in this art having the benefit of hindsight of this disclosure.

FIG. 5 is a schematic cross-sectional view similar to FIGS. 3 and 4, but slightly more close-up, of another channel embodiment 200 useful in certain embodiments of systems and methods of the present disclosure. Embodiment 200 differs from embodiments 100 and 150 in having a primary high momentum burner 46A followed by a secondary high momentum burner 46B. As noted in schematically in FIG. 5, there may at times be created a depression in the bubbles layer 62 by primary high momentum burner 46A. In these embodiments it may be beneficial to install a secondary high momentum burner such as burner 46B, either having lower (but still relatively high) momentum, or less flame and combustion products, or both, in order to burst more bubbles, or partially direct them back into the path of flame or combustion products from primary high momentum burner 46A. Another variation may be to provide one or more tertiary high momentum burners, such as exemplified schematically by dashed circle 46C, in a sidewall structure immediately upstream of skimmer 36.

Figure 6:
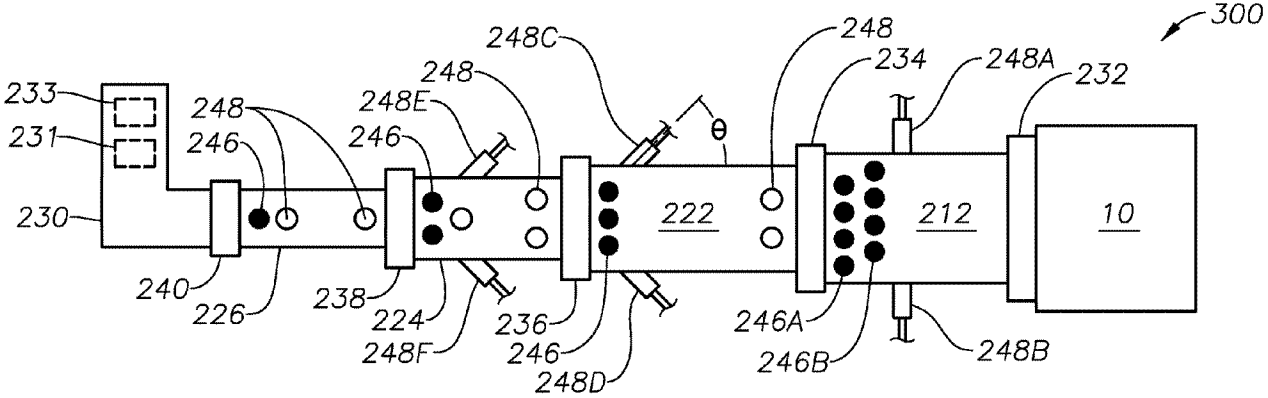
FIG. 6 is a schematic plan view of another embodiment of a glass conditioning channel apparatus and system in accordance with this disclosure.

FIG. 6 is a schematic plan view of another embodiment 300 of a glass conditioning channel apparatus and system in accordance with this disclosure. In embodiment 300, SC melter 10 feeds directly into a conditioning channel, rather than through an exit structure and transition section, and there is substantially no change in direction of molten glass flowing out of melter 10 and section 212. Embodiment 300 illustrates further possible variations and features of apparatus, systems, and methods of this disclosure, for example, the provision in section 212 of multiple high momentum burners 246A in a first row immediately upstream of a skimmer 234, and a second row of high momentum burners 246B immediately upstream of the first row. Burners 246B in the second row are slightly offset from burners 246A in the first row in order to burst bubbles that may be missed by burners 246A. Also illustrated schematically are low momentum burners 248A, 248B in opposite sidewalls of section 212, with two low momentum burners 248 positioned immediately downstream of skimmer 234 in section 222. Section 222 further includes three high momentum burners in a row immediately upstream of skimmer 236, and two sidewall-mounted low momentum burners 248C and 248D positioned at variable angle θ, Section 224 includes similar features, including sidewall-mounted non-impingement burners 248E, 248F, but differs by the provision of only one low momentum burner and two high momentum burners upstream of skimmer 238. Section 226 has burner positioning similar to the sections in embodiment 100 of FIG. 1. Skimmer 240 separates section 226 from a forehearth 230 having a shape promoting a change of direction, with two outlets 231 and 233 illustrated in dashed boxes. An exit structure 232 fluidly and mechanically connects melter 10 with section 212.

Figure 7:
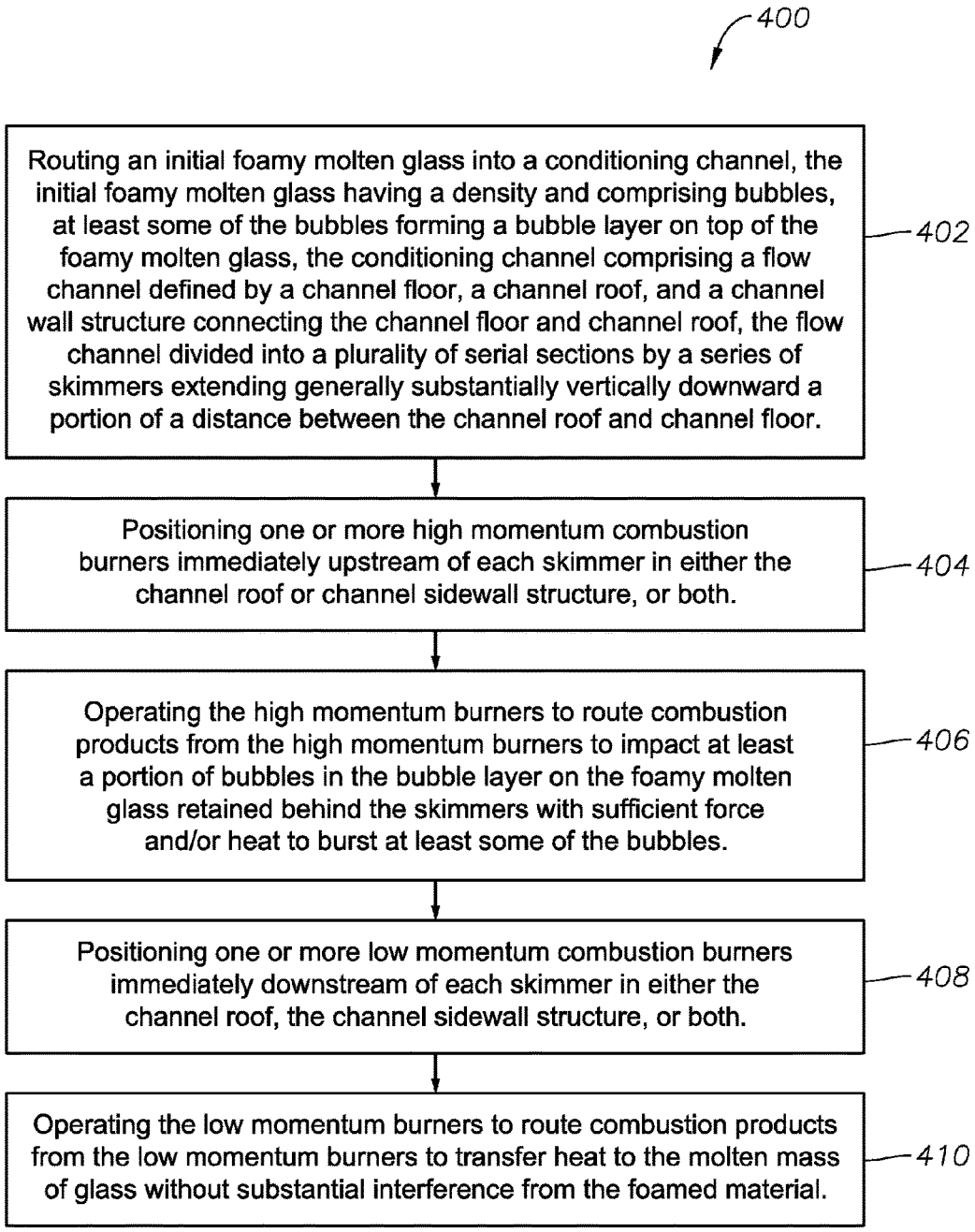
FIGS. 7 and 8 are logic diagrams of two method embodiments of the present disclosure.
Figure 8:
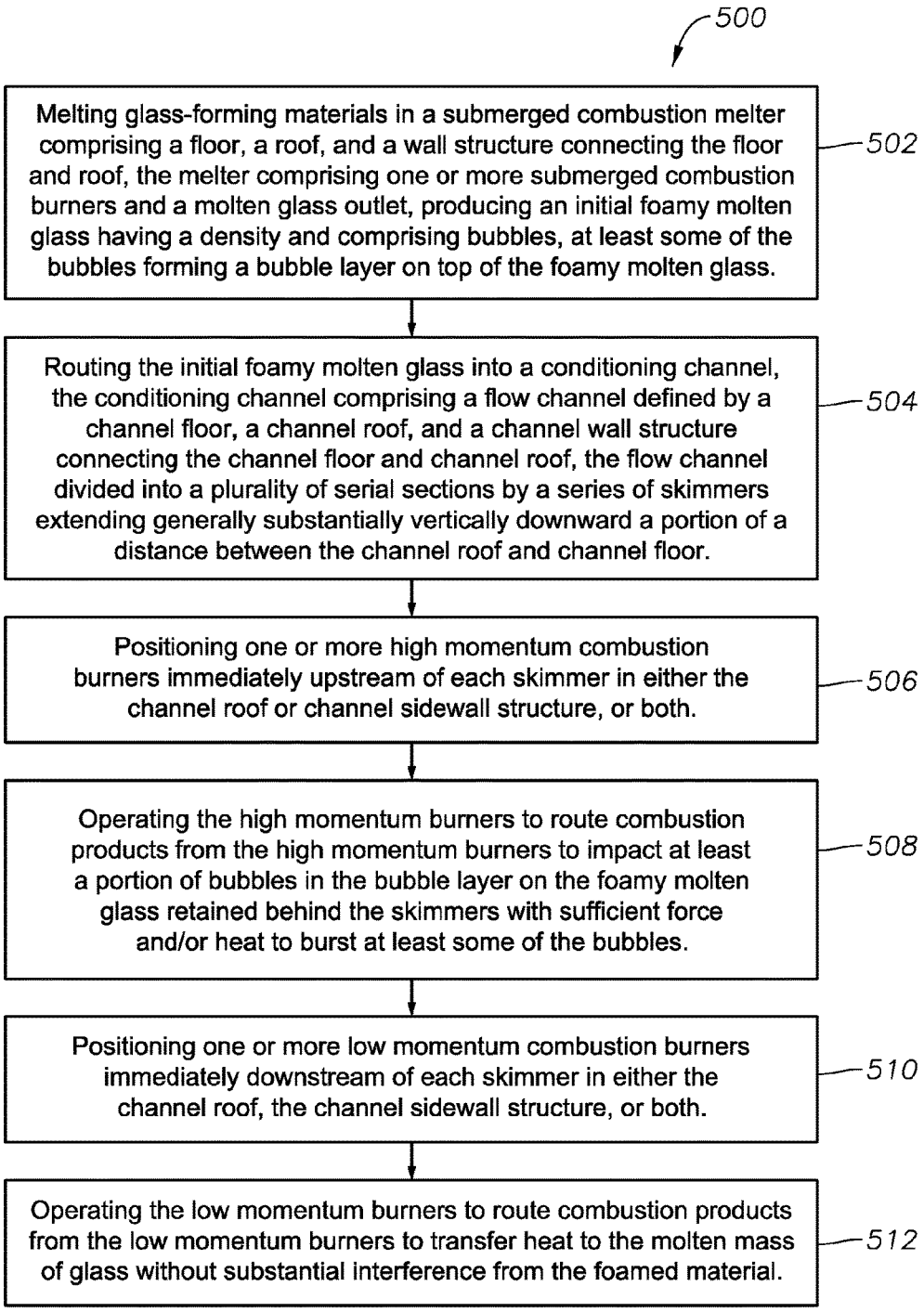

FIGS. 7 and 8 are logic diagrams of two method embodiments 400 and 500 of the present disclosure. Method embodiment 400 includes the step of routing an initial foamy molten glass into a conditioning channel, the initial foamy molten glass having a density and comprising bubbles, at least some of the bubbles forming a bubble layer on top of the foamy molten glass, the conditioning channel comprising a flow channel defined by a channel floor, a channel roof, and a channel wall structure connecting the channel floor and channel roof, the flow channel divided into a plurality of serial sections by a series of skimmers extending generally substantially vertically downward a portion of a distance between the channel roof and channel floor, box 402. The method continues with the steps of positioning one or more high momentum combustion burners immediately upstream of each skimmer in either the channel roof or channel sidewall structure, or both, box 404, and operating the high momentum burners to route combustion products from the high momentum burners to impact at least a portion of bubbles in the bubble layer on the foamy molten glass retained behind the skimmers with sufficient force and/or heat to burst at least some of the bubbles, box 406. Method embodiment 400 also includes positioning one or more low momentum combustion burners immediately downstream of each skimmer in either the channel roof, the channel sidewall structure, or both, box 408, and operating the low momentum burners to route combustion products from the low momentum burners to transfer heat to the molten mass of glass without substantial interference from the foamed material, box 410.

Method embodiment 500 includes melting glass-forming materials in a submerged combustion melter comprising a floor, a roof, and a wall structure connecting the floor and roof, the melter comprising one or more submerged combustion burners and a molten glass outlet, producing an initial foamy molten glass having a density and comprising bubbles, at least some of the bubbles forming a bubble layer on top of the foamy molten glass, box 502. Embodiment 500 further includes routing the initial foamy molten glass into a conditioning channel, the conditioning channel comprising a flow channel defined by a channel floor, a channel roof, and a channel wall structure connecting the channel floor and channel roof, the flow channel divided into a plurality of serial sections by a series of skimmers extending generally substantially vertically downward a portion of a distance between the channel roof and channel floor, box 504. Method embodiment 500 further includes positioning one or more high momentum combustion burners immediately upstream of each skimmer in either the channel roof or channel sidewall structure, or both, box 506, and operating the high momentum burners to route combustion products from the high momentum burners to impact at least a portion of bubbles in the bubble layer on the foamy molten glass retained behind the skimmers with sufficient force and/or heat to burst at least some of the bubbles, box 508. Method embodiment 500 also includes positioning one or more low momentum combustion burners immediately downstream of each skimmer in either the channel roof, the channel sidewall structure, or both, box 510, and operating the low momentum burners to route combustion products from the low momentum burners to transfer heat to the molten mass of glass without substantial interference from the foamed material, box 512.

High momentum burners useful in apparatus, systems, and methods of this disclosure include those disclosed assignee's U.S. patent application Ser. No. 13/268,130, filed Oct. 7, 2011, which include an oxidant conduit and an inner concentric fuel conduit. Oxidant and fuel supplies for these burners may quick connect/disconnect features, allowing a hose of other source of fuel to be quickly attached to and detached from the conduits. For example, high momentum burner embodiments may comprise a nominal ½-inch stainless steel Schedule 40 pipe for the fuel conduit and a nominal ¾-inch stainless steel Schedule 40 pipe for the oxidant conduit. Nominal ¼-inch Schedule 40 pipe has an external diameter of 0.54 inch (1.37 cm) and an internal diameter of 0.36 inch (0.91 cm), while nominal ¾-inch Schedule 40 pipe has an external diameter of 1.05 inch (2.67 cm) and internal diameter of 0.82 inch (2.08 cm). The selection of conduit schedule dictates the annular distance between the OD of the inner fuel conduit and the internal diameter (ID) of the oxidant conduit. These dimensions are merely examples, as any arrangement that produces the desired momentum and/or heat will be suitable, and within the skills of the skilled artisan in possession of this disclosure. High momentum burners may be fluid-cooled by employing a third concentric conduit creating an annular region between the oxidant conduit and third conduit.

For high momentum burners burning natural gas, the burners may have a fuel firing rate ranging from about 10 to about 1000 scfh (from about 280 L/hr. to about 28,000 L/hr.); an oxygen firing rate ranging from about 15 to about 2500 scfh (from about 420 L/hr. to about 71,000 L/hr.); a combustion ratio ranging from about 1.5 to about 2.5; nozzle velocity ratio (ratio of velocity of fuel to oxygen at the fuel nozzle tip) ranging from about 0.5 to about 2.5; fuel gas velocity ranging from about 150 to about 1000 ft./sec (from about 46 m/sec to about 300 m/sec); and oxygen velocity ranging from about 150 to about 1000 ft./sec (from about 46 m/sec to about 300 m/sec). Of course these numbers depend on the heating value of the fuel, amount of oxygen in the "oxygen" stream, temperatures and pressures of the fuel and oxidant, and the like, among other parameters. In one typical operation, the high momentum burner would have a combustion ratio of 2.05:1; a velocity ratio of 1; firing rate of natural gas of 500 scfh (14,000 L/hr.) and 1075 scfh (30,400 L/hr.) oxygen; natural gas and oxygen velocities each of 270 ft./sec (80 m/sec); natural gas pressure of 1 psig (6.9 KPa); and oxygen pressure of 0.6 psig (4.1 KPa), pressures measured at the entrance to the combustion chamber.

Low momentum burners useful in apparatus, systems, and methods of this disclosure may include some of the features of those disclosed in assignee's U.S. patent application Ser. No. 13/268,130, filed Oct. 7, 2011.

For low momentum burners using natural gas as fuel, the burners may have a fuel firing rate ranging from about 0.4 to about 40 scfh (from about 11 L/hr. to about 1,120 L/hr.); an oxygen firing rate ranging from about 0.6 to about 100 scfh (from about 17 L/hr. to about 2,840 L/hr.); a combustion ratio ranging from about 1.5 to about 2.5; nozzle velocity ratio (ratio of velocity of fuel to oxygen at the fuel nozzle tip) ranging from about 0.5 to about 2.5; a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

Those of skill in this art will readily understand the need for, and be able to construct suitable fuel supply conduits and oxidant supply conduits, as well as respective flow control valves, threaded fittings, quick connect/disconnect fittings, hose fittings, and the like.

The flow channel may be rectangular as illustrated in FIG. 2, or may be a shape such as a generally U-shaped or V-shaped channel or trough of refractory material supported by a metallic superstructure.

High momentum burners and low momentum burners may be mounted to the sidewall structure and/or roof of the flow channel sections using adjustable mounts, such as a ceramic-lined ball turrets, as explained in the afore-mentioned Ser. No. 13/268,130 application.

The flow rate of the foamy or reduced foam molten glass through the flow channel sections will in turn depend on many factors, including the dimensions of flow channel, size of SC melter, skimmer depth into the molten glass, temperature of the melts, viscosity of the melts, and like parameters, but in general the flow rate of molten glass may range from about 0.5 lb./min to about 5000 lbs./min or more (about 0.23 kg/min to about 2300 kg/min or more), or from about 10 lbs./min to about 500 lbs./min (from about 4.5 kg/min to about 227 kg/min), or from about 100 lbs./min to 300 lbs./min (from about 45 kg/min to about 136 kg/min).

Submerged combustion melters in system and method embodiments described herein may be any of the currently known submerged combustion melter designs, or may be one of those described in assignee's currently pending patent application Ser. No. 12/817,754, filed Jun. 17, 2010. Submerged combustion melters useful in the practice of the methods and apparatus of this description may take any number of forms, including those described in assignee's co-pending application Ser. No. 12/817,754, which describes sidewalls forming an expanding melting zone formed by a first trapezoidal region, and a narrowing melting zone formed by a second trapezoidal region, wherein a common base between the trapezoid defines the location of the maximum width of the melter. Submerged combustion melter 602 may include a roof, side walls, a floor or bottom, one or more submerged combustion burners, an exhaust chute, one or more molten glass outlets, and optionally fluid-cooled panels comprising some or all of the side walls.

Submerged combustion melters may be fed a variety of feed materials by one or more roll stands, which in turn supports one or more rolls of glass mat, as described in assignee's co-pending U.S. application Ser. No. 12/888,970, filed Sep. 23, 2010, incorporated herein by reference. In certain embodiments powered nip rolls may include cutting knives or other cutting components to cut or chop the mat (or roving, in those embodiments processing roving) into smaller length pieces prior to entering melter 602. Also provided in certain embodiments may be a glass batch feeder. Glass batch feeders are well-known in this art and require no further explanation. The initial raw material may include any material suitable for forming molten glass such as, for example, limestone, glass, sand, soda ash, feldspar and mixtures thereof. In one embodiment, a glass composition for producing glass fibers is "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_20+K_2O$, 0-1.5% $TiO_2$ and 0-1% $F_2$. Other glass compositions may be used, such as those described in assignee's published U.S. application 20080276652. The initial raw material can be provided in any form such as, for example, relatively small particles.

Certain embodiments may comprise a process control scheme for the submerged combustion melter and burners. For example, as explained in the '970 application, a master process controller may be configured to provide any number of control logics, including feedback control, feed-forward control, cascade control, and the like. The disclosure is not limited to a single master process controller, as any combination of controllers could be used. The term "control", used as a transitive verb, means to verify or regulate by comparing with a standard or desired value. Control may be closed loop, feedback, feed-forward, cascade, model predictive, adaptive, heuristic and combinations thereof The term "controller" means a device at least capable of accepting input from sensors and meters in real time or near-real time, and sending commands directly to burner control elements, and/or to local devices associated with burner control elements and glass mat feeding devices able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules. The controller may utilize Model Predictive Control (MPC) or other advanced multivariable control methods used in multiple input/multiple output (MIMO) systems. As mentioned previously, the methods of assignee's co-pending application Ser. No. 13/268,065, filed Oct. 7, 2011, using the vibrations and oscillations of the melter itself, may prove useful predictive control inputs.

Submerged combustion burners useful in the SC melter apparatus described herein include those described in U.S. Pat. Nos. 4,539,034; 3,170,781; 3,237,929; 3,260,587;

3,606,825; 3,627,504; 3,738,792; 3,764,287; and 7,273,583, and assignee's co-pending patent application Ser. No. 13/268,028, filed Oct. 7, 2011. The total quantities of fuel and oxidant used by the SC burners in systems of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2. In certain embodiments, the equivalent fuel content of the feed material must be taken into account. For example, organic binders in glass fiber mat scrap materials will increase the oxidant requirement above that required strictly for fuel being combusted. In consideration of these embodiments, the combustion ratio may be increased above 1.2, for example to 1.5, or to 2, or 2.5, or even higher, depending on the organic content of the feed materials.

The velocity of the fuel gas in the various SC burners depends on the burner geometry used, but generally is at least about 15 m/s. The upper limit of fuel velocity depends primarily on the desired mixing of the melt in the melter apparatus, melter geometry, and the geometry of the burner; if the fuel velocity is too low, the flame temperature may be too low, providing inadequate melting, which is not desired, and if the fuel flow is too high, flame might impinge on the melter floor, roof or wall, and/or heat will be wasted, which is also not desired.

In certain embodiments the SC burners may be floor-mounted burners. In certain embodiments, the SC burners may be positioned in rows substantially perpendicular to the longitudinal axis (in the melt flow direction) of melter 10. In certain embodiments, the SC burners may be positioned to emit combustion products into molten glass in a melting zone of melter 10 in a fashion so that the gases penetrate the melt generally perpendicularly to the floor. In other embodiments, one or more burners may emit combustion products into the melt at an angle to the floor of melter 10, as taught in assignee's pending Ser. No. 12/817,754.

Submerged combustion melters useful in systems and methods in accordance with the present disclosure may also comprise one or more wall-mounted submerged combustion burners, and/or one or more roof-mounted burners. Roof-mounted burners may be useful to pre-heat the melter apparatus melting zone, and serve as ignition sources for one or more submerged combustion burners. Melters having only wall-mounted, submerged-combustion burners are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners. In certain embodiments, if there is a possibility of carryover of particles to the exhaust, one or more roof-mounted burners could be used to form a curtain to prevent particulate carryover. In certain embodiments, all submerged combustion burners are oxy/fuel burners (where "oxy" means oxygen, or oxygen-enriched air, as described earlier), but this is not necessarily so in all embodiments; some or all of the submerged combustion burners may be air/fuel burners. Furthermore, heating may be supplemented by electrical heating in certain melter embodiments, in certain melter zones, and in the lehr. In certain embodiments the oxy-fuel burners may comprise one or more submerged combustion burners each having co-axial fuel and oxidant tubes forming an annular space there between, wherein the outer tube extends beyond the end of the inner tube, as taught in U.S. Pat. No. 7,273,583, incorporated herein by reference. Burners may be flush-mounted with the melter floor in certain embodiments. In other embodiments, such as disclosed in the '583 patent, a portion of one or more of the burners may extend slightly into the melt above the melter floor.

In certain embodiments, melter side walls may have a free-flowing form, devoid of angles. In certain other embodiments, side walls may be configured so that an intermediate location may comprise an intermediate region of melters having constant width, extending from a first trapezoidal region to the beginning of a narrowing melting region. Other embodiments of suitable melters are described in the above-mentioned '754 application.

As mentioned herein, useful melters may include refractory fluid-cooled panels. Liquid-cooled panels may be used, having one or more conduits or tubing therein, supplied with liquid through one conduit, with another conduit discharging warmed liquid, routing heat transferred from inside the melter to the liquid away from the melter. Liquid-cooled panels may also include a thin refractory liner, which minimizes heat losses from the melter, but allows formation of a thin frozen glass shell to form on the surfaces and prevent any refractory wear and associated glass contamination. Other useful cooled panels include air-cooled panels, comprising a conduit that has a first, small diameter section, and a large diameter section. Warmed air transverses the conduits such that the conduit having the larger diameter accommodates expansion of the air as it is warmed. Air-cooled panels are described more fully in U.S. Pat. No. 6,244,197. In certain embodiments, the refractory fluid cooled-panels are cooled by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids that may be organic, inorganic, or some combination thereof, for example, salt solutions, glycol solutions, oils and the like. Other possible heat transfer fluids include steam (if cooler than the oxygen manifold temperature), carbon dioxide, or mixtures thereof with nitrogen. Heat transfer fluids may be compositions comprising both gas and liquid phases, such as the higher chlorofluorocarbons.

Both the melter and flow channel floors and sidewall structures may include a glass-contact refractory lining, as discussed herein. The glass-contact lining may be 1 centimeter, 2 centimeters, 3 centimeters or more in thickness, however, greater thickness may entail more expense without resultant greater benefit. The refractory lining may be one or multiple layers. Glass-contact refractory used in melters and channels described herein may be cast concretes such as disclosed in U.S. Pat. No. 4,323,718. Two cast concrete layers are described in the 718 patent, the first being a hydraulically setting insulating composition (for example, that known under the trade designation CASTABLE BLOC-MIX-G, a product of Fleischmann Company, Frankfurt/Main, Federal Republic of Germany). This composition may be poured in a form of a wall section of desired thickness, for example a layer 5 cm thick, or 10 cm, or greater. This material is allowed to set, followed by a second layer of a hydraulically setting refractory casting composition (such as that known under the trade designation RAPID BLOCK RG 158, a product of Fleischmann company, Frankfurt/Main, Federal Republic of Germany) may be applied thereonto. Other suitable materials for the refractory cooled panels, melter and channel refractory liners, and refractory block burners (if used) are fused zirconia ($ZrO_2$), fused cast AZS (alumina-zirconia-silica), rebonded AZS, or fused cast alumina ($Al_2O_3$). The choice of a particular material is dictated among other parameters by the melter geometry and type of glass to be produced. The refractory or refractory-lined channels or troughs described in accordance with the present disclosure may be constructed using refractory cooled panels.

Those having ordinary skill in this art will appreciate that there are many possible variations of the melter, channels, troughs, burners, and adjustment mechanisms to adjust combustion product direction described herein, and will be able to devise alternatives and improvements to those described herein that are nevertheless considered to be within the claims of the present patent.

Although only a few exemplary embodiments of this disclosure have been described in detail above, those skilled in the art will readily appreciate that many modifications are possible in the exemplary embodiments without materially departing from the novel apparatus and processes described herein. Accordingly, all such modifications are intended to be included within the scope of this disclosure as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. An apparatus for conditioning molten glass comprising:

a flow channel defined by a floor, a roof, and a sidewall structure connecting the floor and roof;

the flow channel divided into a plurality of serial sections by a series of skimmers extending generally substantially vertically downward a portion of a distance between the roof and floor;

one or more high momentum combustion burners positioned immediately upstream of each skimmer in either the roof or sidewall structure, or both, to burst at least some foamed material retained behind the skimmers and floating on top of a molten mass of glass flowing in the flow channel by heat and/or direct impingement thereon; and one or more low momentum combustion burners positioned immediately downstream of each skimmer in either the roof, the sidewall structure, or both, and positioned to transfer heat to the molten mass of glass without substantial interference from the foamed material.

2. The apparatus of claim 1 comprising a first section fluidly and mechanically connecting the flow channel to a submerged combustion glass melter, the roof, floor and sidewall structure of the first section configured to promote a change of direction of flow of the molten mass of glass, wherein the change of direction varies from between about 30 degrees to about 90 degrees.

3. The apparatus of claim 2 comprising wherein the first section has a first subsection and a second subsection, wherein the first subsection causes the mass of molten glass to flow in a first flow direction, and the second subsection causes the mass to flow in a direction different from the first direction.

4. The apparatus of claim 3 comprising wherein the first subsection has a flow channel width greater than a flow channel width of the second subsection.

5. The apparatus of claim 1 comprising wherein each of the plurality of sections has a flow channel width $W_1$, $W_2$, $W_3$, . . . $W_N$, wherein N represents the Nth flow channel in the plurality of sections, and $W_1>W_2>W_3> \ldots W_N$.

6. The apparatus of claim 1 comprising wherein the sidewall structure of each section has sufficient glass-contact refractory to accommodate an operating depth of molten mass of glass ranging from about 5 inches (about 13 cm) to about 15 inches (about 38 cm).

7. The apparatus of claim 1 comprising wherein the sidewall structure of each section has sufficient glass-contact refractory to accommodate an operating depth of molten mass of glass ranging from about 5 inches (about 13 cm) to about 10 inches (about 25 cm).

8. The apparatus of claim 1 comprising wherein the sidewall structures and floors of each section are comprised of glass-contact refractory, wherein the sidewall structure's glass-contact refractory extends at least 2 inches (5.1 cm) above an operating level of molten mass of glass upstream of each skimmer.

9. The apparatus of claim 8 comprising wherein the sidewall structure's glass-contact refractory extends from at least 2 inches (5.1 cm) above the level of molten mass of glass upstream of each skimmer to about 18 inches (46 cm) above the operating level of molten mass of glass upstream of each skimmer.

10. The apparatus of claim 8 comprising wherein the glass-contact refractory extends at least 2 inches (5.1 cm) above the operating level of molten mass of glass in each section, with the glass-contact refractory gradually extending higher up the sidewall structure in each section in regions immediately upstream of each skimmer to no less than 18 inches (46 cm).

11. The apparatus of claim 1 comprising wherein all of the high momentum combustion burners are positioned along a centerline of the flow channel in the roof of each section.

12. The apparatus of claim 1 comprising all of the low momentum combustion burners are positioned along a centerline of the flow channel in the roof of each section.

13. The apparatus of claim 1 comprising wherein the skimmers are separated along a longitudinal length of the flow channel by a separation distance "D" of at least about 5 feet (152 cm), wherein the separation distance may be the same or different from section to section.

14. The apparatus of claim 13 comprising wherein "D" is greater than or equal to about 5 feet (152 cm) and less than or equal to about 15 feet (456 cm).

15. The apparatus of claim 1 comprising wherein the flow channel of each section N has a height "$h_N$", and each skimmer has a distal end extending downward at least $0.5 \times h_N$ and wherein the distal end of each skimmer are below an operating level of the molten mass of glass.

16. The apparatus of claim 1 wherein the high momentum burners have a fuel velocity ranging from about 150 ft./second to about 1000 ft./second (about 46 meters/second to about 305 meters/second) and an oxidant velocity ranging from about 150 ft./second to about 1000 ft./second (about 46 meters/second to about 305 meters/second).

17. The apparatus of claim 1 wherein the low momentum burners have a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

18. A system for conditioning molten glass comprising:

a submerged combustion melter comprising a floor, a roof, a sidewall structure connecting the floor and roof, a melting zone being defined by the floor, roof and wall structure, and a plurality of burners, at least some of which are positioned to direct combustion products into the melting zone under a level of molten glass in the melting zone and form a turbulent molten glass, the melter vessel comprising a batch feeder attached to the wall or roof above the level, and an exit end comprising a melter exit structure for discharging the molten glass, the melter exit structure fluidly and mechanically connecting the melter vessel to a molten glass conditioning channel, the melter configured to produce an initial foamy molten glass having a density and comprising bubbles, at least some of the bubbles forming a bubble layer on top of the foamy molten glass;

the molten glass conditioning channel comprising:

a flow channel defined by a channel floor, a channel roof, and a channel wall structure connecting the channel floor and channel roof;

the flow channel divided into a plurality of serial sections by a series of skimmers extending generally substantially vertically downward a portion of a distance between the channel roof and channel floor;

one or more high momentum combustion burners positioned immediately upstream of each skimmer in either the channel roof or channel sidewall structure, or both, to burst at least some foamed material retained behind the skimmers and floating on top of the molten mass of glass flowing in the flow channel by heat and/or direct impingement thereon; and one or more low momentum combustion burners positioned immediately downstream of each skimmer in either the channel roof, the channel sidewall structure, or both, and positioned to transfer heat to the molten mass of glass without substantial interference from the foamed material.

19. The system of claim 18 comprising wherein each of the plurality of sections has a flow channel width $W_1$, $W_2$, $W_3$, . . . $W_N$, wherein N represents the Nth flow channel in the plurality of sections, and $W_1>W_2>W_3>\ldots W_N$.

20. The system of claim 18 comprising wherein the sidewall structure of each section has sufficient glass-contact refractory to accommodate an operating depth of molten mass of glass ranging from about 5 inches (about 13 cm) to about 15 inches (about 38 cm).

21. The system of claim 18 comprising wherein the sidewall structure of each section has sufficient glass-contact refractory to accommodate an operating depth of molten mass of glass ranging from about 5 inches (about 13 cm) to about 10 inches (about 25 cm).

22. The system of claim 18 comprising wherein the sidewall structures and floors of each section are comprised of glass-contact refractory, wherein the sidewall structure's glass-contact refractory extends at least 2 inches (5.1 cm) above an operating level of molten mass of glass upstream of each skimmer.

23. The system of claim 22 comprising wherein the sidewall structure's glass-contact refractory extends from at least 2 inches (5.1 cm) above the level of molten mass of glass upstream of each skimmer to about 18 inches (46 cm) above the operating level of molten mass of glass upstream of each skimmer.

24. The system of claim 22 comprising wherein the glass-contact refractory extends at least 2 inches (5.1 cm) above the operating level of molten mass of glass in each section, with the glass-contact refractory gradually extending higher up the sidewall structure in each section in regions immediately upstream of each skimmer to no less than 18 inches (46 cm).

25. The system of claim 18 comprising wherein all of the high momentum combustion burners are positioned along a centerline of the flow channel in the roof of each section.

26. The system of claim 18 comprising all of the low momentum combustion burners are positioned along a centerline of the flow channel in the roof of each section.

27. The system of claim 18 comprising wherein the skimmers are separated along a longitudinal length of the flow channel by a separation distance "D" of at least about 5 feet (152 cm), wherein the separation distance may be the same or different from section to section.

28. The system of claim 25 comprising wherein "D" is greater than or equal to about 5 feet (152 cm) and less than or equal to about 15 feet (456 cm).

29. The system of claim 18 comprising wherein the flow channel of each section N has a height "$h_N$", and each skimmer has a distal end extending downward at least $0.5\times h_N$ and wherein the distal end of each skimmer are below an operating level of the molten mass of glass.

30. The system of claim 18 wherein one or more of the high momentum burners are adjustable with respect to direction of flow of their combustion products.

31. The system of claim 18 wherein one or more of the low momentum burners are adjustable with respect to direction of flow of their combustion products.

32. The system of claim 18 wherein the high momentum burners have a fuel velocity ranging from about 150 ft./second to about 1000 ft./second (about 46 meters/second to about 305 meters/second) and an oxidant velocity ranging from about 150 ft./second to about 1000 ft./second (about 46 meters/second to about 305 meters/second).

33. A method for conditioning molten glass comprising:

a) routing an initial foamy molten glass into a conditioning channel, the initial foamy molten glass having a density and comprising bubbles, at least some of the bubbles forming a bubble layer on top of the foamy molten glass, the conditioning channel comprising a flow channel defined by a channel floor, a channel roof, and a channel sidewall structure connecting the channel floor and channel roof, the flow channel divided into a plurality of serial sections by a series of skimmers extending generally substantially vertically downward a portion of a distance between the channel roof and channel floor;

b) positioning one or more high momentum combustion burners immediately upstream of each skimmer in either the channel roof or channel sidewall structure, or both;

c) operating the high momentum burners to route combustion products from the high momentum burners to impact at least a portion of bubbles in the bubble layer on the foamy molten glass retained behind the skimmers with sufficient force and/or heat to burst at least some of the bubbles; and d) positioning one or more low momentum combustion burners immediately downstream of each skimmer in either the channel roof, the channel sidewall structure, or both; and e) operating the low momentum burners to route combustion products from the low momentum burners to transfer heat to the molten mass of glass without substantial interference from the foamed material.

34. The method of claim 33 comprising adjusting one or more of the high momentum burners with respect to direction of flow of their combustion products.

35. The method of claim 33 comprising adjusting fuel velocity of the high momentum burners to a value ranging from about 150 ft./second to about 1000 ft./second (about 46 meters/second to about 305 meters/second) and adjusting oxidant velocity to a value ranging from about 150 ft./second to about 1000 ft./second (about 46 meters/second to about 305 meters/second), wherein the fuel and oxidant velocities may be the same or different.

36. The method of claim 33 comprising adjusting fuel velocity of the low momentum burners to a value ranging from about 6 ft./second to about 40 ft./second (about 2 meters/second to about 12 meters/second) and adjusting oxidant velocity to a value ranging from about 6 ft./second to about 40 ft./second (about 2 meters/second to about 12 meters/second), wherein the fuel and oxidant velocities may be the same or different.

37. A method for conditioning molten glass comprising:

a) melting glass-forming materials in a submerged combustion melter comprising a floor, a roof, and a sidewall structure connecting the floor and roof, the melter comprising one or more submerged combustion burners and a molten glass outlet, producing an initial foamy molten glass having a density and comprising bubbles, at least some of the bubbles forming a bubble layer on top of the foamy molten glass;

b) routing the initial foamy molten glass into a conditioning channel, the conditioning channel comprising a flow channel defined by a channel floor, a channel roof, and a channel wall structure connecting the channel floor and channel roof, the flow channel divided into a plurality of serial sections by a series of skimmers extending generally substantially vertically downward a portion of a distance between the channel roof and channel floor;

c) positioning one or more high momentum combustion burners immediately upstream of each skimmer in either the channel roof or channel sidewall structure, or both;

d) operating the high momentum burners to route combustion products from the high momentum burners to impact at least a portion of bubbles in the bubble layer on the foamy molten glass retained behind the skimmers with sufficient force and/or heat to burst at least some of the bubbles;

e) positioning one or more low momentum combustion burners immediately downstream of each skimmer in either the channel roof, the channel sidewall structure, or both; and f) operating the low momentum burners to route combustion products from the low momentum burners to transfer heat to the molten mass of glass without substantial interference from the foamed material.

38. The method of claim 37 comprising adjusting one or more of the high momentum burners with respect to direction of flow of their combustion products.

39. The method of claim 37 comprising adjusting fuel velocity of the high momentum burners to a value ranging from about 150 ft./second to about 1000 ft./second (about 46 meters/second to about 305 meters/second) and adjusting oxidant velocity to a value ranging from about 150 ft./second to about 1000 ft./second (about 46 meters/second to about 305 meters/second), wherein the fuel and oxidant velocities may be the same or different.

40. The method of claim 37 comprising adjusting fuel velocity of the low momentum burners to a value ranging from about 6 ft./second to about 40 ft./second (about 2 meters/second to about 12 meters/second) and adjusting oxidant velocity to a value ranging from about 6 ft./second to about 40 ft./second (about 2 meters/second to about 12 meters/second), wherein the fuel and oxidant velocities may be the same or different.

*41. An apparatus for conditioning molten glass comprising:*

*a flow channel defined by a floor, a roof, and a sidewall structure connecting the floor and roof;*

*the flow channel divided into two sections by a skimmer extending generally substantially vertically downward a portion of a distance between the roof and floor;*

*one or more high momentum combustion burners positioned upstream of the skimmer in either the roof or sidewall structure, or both, to burst at least some foamed material retained behind the skimmers and floating on top of a molten mass of glass flowing in the flow channel by heat and/or direct impingement thereon; and*

*one or more low momentum combustion burners positioned downstream of the skimmer in either the roof, the sidewall structure, or both, and positioned to transfer heat to the molten mass of glass without substantial interference from the foamed material.*

*42. The apparatus of claim 41 comprising: a first section fluidly and mechanically connecting the flow channel to a submerged combustion glass melter.*

*43. The apparatus of claim 42 comprising wherein the first section has a first subsection and a second subsection, wherein the first subsection causes the mass of molten glass to flow in a first flow direction, and the second subsection causes the mass to flow in a direction different from the first direction.*

*44. The apparatus of claim 43 comprising wherein the first subsection has a flow channel width greater than a flow channel width of the second subsection.*

*45. The apparatus of claim 41 comprising wherein the sidewall structure of each section has sufficient glass-contact refractory to accommodate an operating depth of molten mass of glass ranging from about 5 inches (about 13 cm) to about 15 inches (about 38 cm).*

*46. The apparatus of claim 41 comprising wherein the sidewall structures and floors of each section are comprised of glass-contact refractory, wherein the sidewall structure's glass-contact refractory extends at least 2 inches (5.1 cm) above an operating level of molten mass of glass upstream of each skimmer.*

*47. The apparatus of claim 41 comprising wherein all of the high momentum combustion burners are positioned along a centerline of the flow channel in the roof of each section.*

*48. The apparatus of claim 41 comprising all of the low momentum combustion burners are positioned along a centerline of the flow channel in the roof of each section.*

*49. The apparatus of claim 41 comprising wherein the skimmers are separated along a longitudinal length of the flow channel by a separation distance "D" of at least about 5 feet (152 cm), wherein the separation distance may be the same or different from section to section.*

*50. The apparatus of claim 41 comprising wherein the flow channel of each section N has a height "$h_N$", and each skimmer has a distal end extending downward at least*

*$0.5 \times h_N$ and wherein the distal end of each skimmer are below an operating level of the molten mass of glass.*

*51. The apparatus of claim 41 wherein the high momentum burners have a fuel velocity ranging from about 150 ft./second to about 1000 ft./second (about 46 meters/second to about 305 meters/second) and an oxidant velocity ranging from about 150 ft./second to about 1000 ft./second (about 46 meters/second to about 305 meters/second) and the low momentum burners have a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).*

*52. The apparatus of claim 41 wherein the flow channel has a shape selected from one or more of rectangular, U-shaped, or V-shaped.*

*53. A method for conditioning molten glass comprising:*

*a) routing an initial foamy molten glass into a conditioning channel and under a skimmer, the initial foamy molten glass having a density and comprising bubbles, the conditioning channel comprising a flow channel defined by a channel floor, a channel roof, and a channel sidewall structure connecting the channel floor and channel roof, the skimmer extending generally substantially vertically downward a portion of a distance between the channel roof and channel floor, thereby collecting foam into a region of high bubble volume on top of the molten glass upstream of the skimmer;*

*b) positioning one or more high momentum combustion burners above the region of high bubble volume upstream of the skimmer in either the channel roof or channel sidewall structure, or both;*

*c) operating the high momentum burners to route combustion products from the high momentum burners to impact at least a portion of bubbles in the region of high bubble volume on the molten glass retained behind the skimmers with sufficient force and/or heat to burst at least some of the bubbles; and*

*d) positioning one or more low momentum combustion burners downstream of each skimmer in either the channel roof, the channel sidewall structure, or both; and*

*e) operating the low momentum burners to route combustion products from the low momentum burners to transfer heat to the molten mass of glass without substantial interference from the foamed material.*

*54. The method of claim 53 further comprising:*

*receiving the initial foamy molten glass from a submerged combustion melter.*

*55. The method of claim 53 comprising:*

*adjusting fuel velocity of the high momentum burners to a value ranging from about 150 ft./second to about 1000 ft./second (about 46 meters/second to about 305 meters/second) and adjusting oxidant velocity to a value ranging from about 150 ft./second to about 1000 ft./second (about 46 meters/second to about 305 meters/second), wherein the fuel and oxidant velocities may be the same or different; and*

*adjusting fuel velocity of the low momentum burners to a value ranging from about 6 ft./second to about 40 ft./second (about 2 meters/second to about 12 meters/second) and adjusting oxidant velocity to a value ranging from about 6 ft./second to about 40 ft./second (about 2 meters/second to about 12 meters/second), wherein the fuel and oxidant velocities may be the same or different.*

*56. A method for conditioning molten glass comprising:*

*a) routing an initial foamy molten glass under a skimmer, thereby collecting foam into a region of high bubble volume on top of the molten glass upstream of the skimmer;*

*b) directing combustion products from at least one high momentum burner onto the region of high bubble volume on the molten glass with sufficient force and/or heat to burst at least some bubbles of the region of high bubble volume; and*

*c) directing combustion products from at least one low momentum burner to transfer heat to the molten glass downstream of the skimmer.*

*57. The method of claim 56 further comprising:*

*positioning one or more high momentum combustion burners above the collected region of high bubble volume upstream of the skimmer; and*

*positioning one or more low momentum combustion burners above the molten glass downstream of the skimmer.*

*58. The method of claim 56 further comprising:*

*receiving the initial foamy molten glass from a submerged combustion melter.*

*59. The method of claim 58 further comprising:*

*melting one or more of limestone, glass, sand, soda ash, feldspar, $SiO_2$, $Al_2O_3$, $Fe_2O_3$, MgO, $B_2O_3$, $Na_2O$, $K_2O$, $TiO_2$ and $F_2$ in the submerged combustion melter to create the initially foamy molten glass.*

*60. A method for conditioning molten glass comprising:*

*a) providing a conditioning channel comprising a flow channel defined by a channel floor, a channel roof, and a channel sidewall structure connecting the channel floor and channel roof, the conditioning channel having one more skimmers extending generally substantially vertically downward a portion of a distance between the channel roof and channel floor;*

*b) routing an initial foamy molten glass having a density and comprising bubbles into the conditioning channel and under the one or more skimmers, thereby causing one or more regions of high bubble volume to collect on top of the molten glass at one or more first locations in the conditioning channel;*

*c) operating at least one high momentum burner above each of the one or more first locations to route combustion products from the high momentum burners to impact at least a portion of bubbles in the one or more regions of high bubble volume with sufficient force and/or heat to burst at least some of the bubbles; and*

*d) operating at least one low momentum burner to route combustion products from the low momentum burner to transfer heat to the top of molten glass at a second location where regions of high bubble volume are not formed.*

*61. The method of claim 60 further comprising:*

*positioning one or more low momentum combustion burners in either the channel roof, the channel sidewall structure, or both, at second locations where regions of high bubble layers are not formed; and*

*positioning one or more high momentum combustion burners above the one or more first locations in either the channel roof or channel sidewall structure, or both.*

*62. A method for conditioning molten glass comprising:*

*a) providing a conditioning channel comprising a flow channel defined by a channel floor, a channel roof, and a channel sidewall structure connecting the channel floor and channel roof;*

*b) separating the conditioning channel into a plurality sections by positioning one or more skimmers in the*

*conditioning channel, each skimmer extending generally substantially vertically downward a portion of a distance between the channel roof and channel floor;*

*c) positioning at least one high momentum burner and at least one low momentum burner in at least one of the plurality of sections in either the channel roof or channel sidewall structure, or both;*

*d) routing an initial foamy molten glass having a density and comprising bubbles into the conditioning channel and under the one or more skimmers, thereby causing a region of high bubble volume to collect on top of the molten glass in a downstream portion of at least one section;*

*e) operating at least one high momentum burner above the region of high bubble volume in the at least one section to impact at least a portion of bubbles in the region with sufficient force and/or heat to burst at least some of the bubbles; and*

*f) operating at least one low momentum burner to route combustion products from the low momentum burners to transfer heat to the top of molten glass in upstream portions of each section where regions of high bubble volume are not formed.*

*63. The method of claim 62 further comprising:*

*receiving the initial foamy molten glass from a submerged combustion melter.*

*64. The method of claim 63 further comprising:*

*melting one or more of limestone, glass, sand, soda ash, feldspar, $SiO_2$, $Al_2O_3$, $Fe_2O_3$, MgO, $B_2O_3$, $Na_2O$, $K_2O$, $TiO_2$ and $F_2$ in the submerged combustion melter to create the initially foamy molten glass.*

*65. An apparatus for conditioning molten glass comprising:*

*a flow channel defined by a floor, a roof, and a sidewall structure connecting the floor and roof;*

*the flow channel divided into a plurality of serial sections by a series of skimmers extending generally substantially vertically downward a portion of a distance between the roof and floor;*

*one or more high momentum combustion burners positioned upstream of each skimmer in either the roof or sidewall structure, or both, to burst at least some foamed material retained behind the skimmers and floating on top of a molten mass of glass flowing in the flow channel by heat and/or direct impingement thereon; and*

*one or more low momentum combustion burners positioned downstream of each skimmer in either the roof, the sidewall structure, or both, and positioned to transfer heat to the molten mass of glass without substantial interference from the foamed material.*

*66. A system for conditioning molten glass comprising:*

*a submerged combustion melter comprising a floor, a roof, a sidewall structure connecting the floor and roof, a melting zone being defined by the floor, roof and wall structure, and a plurality of burners, at least some of which are positioned to direct combustion products into the melting zone under a level of molten glass in the melting zone and form a turbulent molten glass, the melter vessel comprising a batch feeder attached to the wall or roof above the level, and an exit end comprising a melter exit structure for discharging the molten glass, the melter exit structure fluidly and mechanically connecting the melter vessel to a molten glass conditioning channel, the melter configured to produce an initial foamy molten glass having a density and comprising bubbles, at least some of the bubbles forming a bubble layer on top of the foamy molten glass;*

*the molten glass conditioning channel comprising:*

*a flow channel defined by a channel floor, a channel roof, and a channel wall structure connecting the channel floor and channel roof;*

*the flow channel divided into a plurality of serial sections by a series of skimmers extending generally substantially vertically downward a portion of a distance between the channel roof and channel floor;*

*one or more high momentum combustion burners positioned upstream of each skimmer in either the channel roof or channel sidewall structure, or both, to burst at least some foamed material retained behind the skimmers and floating on top of the molten mass of glass flowing in the flow channel by heat and/or direct impingement thereon; and*

*one or more low momentum combustion burners positioned downstream of each skimmer in either the channel roof, the channel sidewall structure, or both, and positioned to transfer heat to the molten mass of glass without substantial interference from the foamed material.*

*67. A method for conditioning molten glass comprising:*

*a) routing an initial foamy molten glass into a conditioning channel, the initial foamy molten glass having a density and comprising bubbles, at least some of the bubbles forming a bubble layer on top of the foamy molten glass, the conditioning channel comprising a flow channel defined by a channel floor, a channel roof, and a channel sidewall structure connecting the channel floor and channel roof, the flow channel divided into a plurality of serial sections by a series of skimmers extending generally substantially vertically downward a portion of a distance between the channel roof and channel floor;*

*b) positioning one or more high momentum combustion burners upstream of each skimmer in either the channel roof or channel sidewall structure, or both;*

*c) operating the high momentum burners to route combustion products from the high momentum burners to impact at least a portion of bubbles in the bubble layer on the foamy molten glass retained behind the skimmers with sufficient force and/or heat to burst at least some of the bubbles; and*

*d) positioning one or more low momentum combustion burners downstream of each skimmer in either the channel roof, the channel sidewall structure, or both; and*

*e) operating the low momentum burners to route combustion products from the low momentum burners to transfer heat to the molten mass of glass without substantial interference from the foamed material.*

*68. A method for conditioning molten glass comprising:*

*a) melting glass-forming materials in a submerged combustion melter comprising a floor, a roof, and a sidewall structure connecting the floor and roof, the melter comprising one or more submerged combustion burners and a molten glass outlet, producing an initial foamy molten glass having a density and comprising bubbles, at least some of the bubbles forming a bubble layer on top of the foamy molten glass;*

*b) routing the initial foamy molten glass into a conditioning channel, the conditioning channel comprising a flow channel defined by a channel floor, a channel roof, and a channel wall structure connecting the channel floor and channel roof, the flow channel divided into a*

*plurality of serial sections by a series of skimmers extending generally substantially vertically downward a portion of a distance between the channel roof and channel floor;*

*c) positioning one or more high momentum combustion burners upstream of each skimmer in either the channel roof or channel sidewall structure, or both;*

*d) operating the high momentum burners to route combustion products from the high momentum burners to impact at least a portion of bubbles in the bubble layer on the foamy molten glass retained behind the skimmers with sufficient force and/or heat to burst at least some of the bubbles;*

*e) positioning one or more low momentum combustion burners downstream of each skimmer in either the channel roof, the channel sidewall structure, or both; and*

*f) operating the low momentum burners to route combustion products from the low momentum burners to transfer heat to the molten mass of glass without substantial interference from the foamed material.*

* * * * *